US010663958B2

(12) United States Patent
Han

(10) Patent No.: US 10,663,958 B2
(45) Date of Patent: May 26, 2020

(54) SCREEN CONTROL METHOD, SYSTEM, EQUIPMENT AND SERVER

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventor: Bing Han, Beijing (CN)

(73) Assignees: BOE TECHNOLOGY GROUP., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 116 days.

(21) Appl. No.: 15/763,297

(22) PCT Filed: Oct. 10, 2017

(86) PCT No.: PCT/CN2017/105520
§ 371 (c)(1),
(2) Date: Mar. 26, 2018

(87) PCT Pub. No.: WO2018/161562
PCT Pub. Date: Sep. 13, 2018

(65) Prior Publication Data
US 2018/0259948 A1 Sep. 13, 2018

(30) Foreign Application Priority Data
Mar. 10, 2017 (CN) .......................... 2017 1 0142964

(51) Int. Cl.
G06Q 10/06 (2012.01)
G05B 19/418 (2006.01)
(Continued)

(52) U.S. Cl.
CPC ... *G05B 19/41885* (2013.01); *G05B 19/4183* (2013.01); *G05B 19/4184* (2013.01);
(Continued)

(58) Field of Classification Search
CPC .......... G05B 19/41885; G05B 19/4183; G05B 19/4184; G06F 16/2457; G06F 3/14;
(Continued)

(56) References Cited

U.S. PATENT DOCUMENTS 5,890,142 A 3/1999 Tanimura et al.
2012/0296769 A1* 11/2012 Ginster, II ........... G06Q 10/087
705/26.8
(Continued)

FOREIGN PATENT DOCUMENTS

CN 104369526 A 2/2015
CN 104506346 A 4/2015
(Continued)

OTHER PUBLICATIONS

International Search Report and Written Opinion dated Jan. 12, 2018; PCT/CN2017/105520.
(Continued)

*Primary Examiner* — Rocio Del Mar Perez-Velez
*Assistant Examiner* — Brian T McMenemy

(57) ABSTRACT

A screen control method applied in the server side, including: receiving a screen practice verification request send by equipment before screen printing by the equipment, in which the verification request includes: a first identification of a screen and a second identification of the equipment; inquiring a prestored database according to the first identification and the second identification, and acquiring a first attribute value of the screen and a second attribute value of the equipment; verifying whether the screen satisfies the practice condition according to the first attribute value and
(Continued)

the second attribute value; and sending the verification result to the equipment, so that the equipment can do corresponding operation according to the verification result.

10 Claims, 13 Drawing Sheets

(51) Int. Cl.
    *G08B 21/18*     (2006.01)
    *G06F 16/2457*     (2019.01)
    *B41F 15/00*     (2006.01)
    *G06F 3/041*     (2006.01)

(52) U.S. Cl.
    CPC ......... *G06F 16/2457* (2019.01); *G06Q 10/06* (2013.01); *G08B 21/18* (2013.01); *G06F 3/0412* (2013.01); *Y02P 90/02* (2015.11)

(58) Field of Classification Search
    CPC ...... G06F 3/0412; G08B 21/18; G06Q 10/06; Y02P 90/02; H04M 1/0266
    See application file for complete search history.

(56) References Cited

U.S. PATENT DOCUMENTS

| | | | | |
|---|---|---|---|---|
| 2013/0160284 A1* | 6/2013 | Gatz | ................... | B21D 39/00 29/715 |
| 2013/0204422 A1* | 8/2013 | Ross | ................... | B21D 31/04 700/117 |
| 2014/0211232 A1* | 7/2014 | Ganesan | ............... | G06F 3/1207 358/1.14 |
| 2015/0041555 A1* | 2/2015 | Ahmadi | ................ | B05C 5/0216 239/71 |
| 2015/0105932 A1* | 4/2015 | Hunt | ..................... | H04L 47/25 700/300 |
| 2015/0367628 A1* | 12/2015 | Kurata | ................... | B41F 15/08 101/123 |
| 2016/0067927 A1* | 3/2016 | Voris | .................... | B33Y 50/02 700/98 |
| 2017/0289139 A1 | 10/2017 | Guo et al. | | |

FOREIGN PATENT DOCUMENTS

| | | |
|---|---|---|
| CN | 105763521 A | 7/2016 |
| CN | 106154989 A | 11/2016 |
| CN | 106274123 A | 1/2017 |
| CN | 205970347 U | 2/2017 |
| CN | 107025272 A | 8/2017 |

OTHER PUBLICATIONS

The First Chinese Office Acton dated Apr. 16, 2019; Appln. No. 201710142964.3.

* cited by examiner

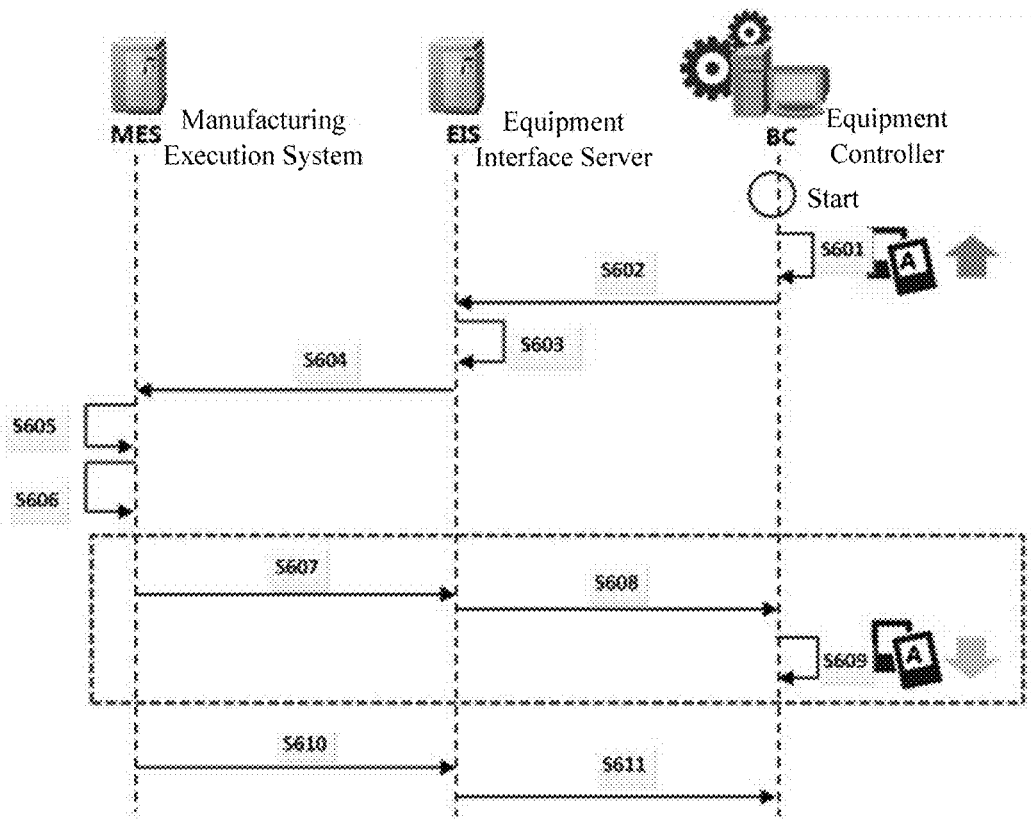

FIG. 8

```
┌─────────────────────────────────────────────────┐
│ Receiving the current use frequency of the      │
│ screen sent by the server.                      │──── S701
└─────────────────────────────────────────────────┘
                         │
                         ▼
┌─────────────────────────────────────────────────┐
│ Cumulatively counting the printing frequency    │
│ of the screen in the equipment by taking the    │
│ current use frequency as the start.             │──── S702
└─────────────────────────────────────────────────┘
                         │
                         ▼
┌─────────────────────────────────────────────────┐
│ Uploading the final use frequency to the server │
│ after the end of screen printing, so that the   │
│ server can update the use frequency             │
│ synchronously in the database                   │──── S703
└─────────────────────────────────────────────────┘
```

FIG. 9

SCREEN CONTROL METHOD, SYSTEM, EQUIPMENT AND SERVER

TECHNICAL FIELD

Embodiments of the present invention relate to screen control method and system, equipment and a server.

BACKGROUND

At present, with the popularization of terminal devices such as smart phones and tablet computers, related manufacturers are also paying more and more attention to the production of terminal devices. More and more screen printing companies are beginning to get involved in the manufacturing field of touch panels. How to improve the quality and the efficiency of screen printing has become its competition direction.

In the relevant art, screen is one of the most important consumables in the screen printing process of the touch panel manufacturer. In the conventional management and control methods, the screen is entirely manually controlled, which is time-consuming and laborious. Moreover, the accuracy rate is low, and the error is prone to occur, so the product quality and the equipment activation can be affected. Therefore, an informatization management method is urgently needed to realize the real-time management and control of the screen, so as to achieve the purpose of fine management.

SUMMARY

The objective of the present invention is to at least solve one of the above technical problems to a certain degree.

In order to achieve the objective, first aspect of embodiments in this disclosure provides a screen control method, applied in the server side, comprising: receiving a screen practice verification request sent by equipment before screen printing by the equipment, in which the verification request includes: a first identification of a screen and a second identification of the equipment; inquiring a prestored database according to the first identification and the second identification, and acquiring a first attribute value of the screen and a second attribute value of the equipment; and verifying whether the screen satisfies the practice condition according to the first attribute value and the second attribute value, and sending the verification result to the equipment, so that the equipment can do corresponding operation according to the verification result.

For example, the screen control method in the embodiments of this disclosure, receives a screen practice verification request sent by the equipment before screen printing by the equipment, and inquire the prestored database according to the first identification and the second identification of the screen in the verification request, acquires a first attribute value of the screen and a second attribute value of the equipment; and verifying whether the screen satisfies the practice condition according to the first attribute value and the second attribute value, and sending the verification result to the equipment, so that the equipment can do corresponding operation according to the verification result.

For example, in an embodiment of this disclosure, receiving the screen practice verification request sent by the equipment includes: receiving the screen practice verification request sent by an equipment interface server, in which the equipment interface server receives the first identification and the second identification sent by the equipment.

For example, in an embodiment of this disclosure, verifying whether the screen satisfies the practice condition according to the first attribute value and the second attribute value includes: acquiring an initial tension value of the screen from the first attribute value, and determining whether the initial tension value falls within the preset range; and/or acquiring a product type of the screen from the first attribute value, acquiring a process type of the equipment from the second attribute value, and determining whether the product type and the process type are matched.

For example, in an embodiment of this disclosure, the method further comprising: inquiring the database according to the first identification and acquiring a current use frequency of the screen if it is verified and known that the screen satisfies the practice condition; sending the current use frequency of the screen to the equipment, so that the equipment can cumulatively count the use frequency of the screen by taking the current use frequency as the start; and receiving the final use frequency uploaded by the equipment after the use of the screen, and updating synchronously in the database.

For example, in an embodiment of this disclosure, the method further comprising: inquiring the database according to the first identification, and acquiring an alarm use frequency of the screen; sending the alarm use frequency of the screen to the equipment, so that the equipment can determine whether the current use frequency reaches the alarm use frequency; and receiving replacement alarm information sent by the equipment after the equipment knows that the current use frequency reaches the alarm use frequency, and sending the replacement alarm information to a monitor terminal, so that the monitor terminal can display the replacement alarm information.

For example, in an embodiment of this disclosure, the method further comprising: inquiring the database according to the first identification, and acquiring an extreme use frequency of the screen; sending the extreme use frequency of the screen to the equipment, so that the equipment can determine whether the current use frequency reaches the extreme use frequency; and receiving crash alarm information sent by the equipment when the equipment determines and knows that the current use frequency reaches the extreme use frequency, and sending the crash alarm information to the monitor terminal, so that the monitor terminal can display the crash alarm information.

In order to achieve the objective, second aspect of embodiments in this disclosure provides a screen control method, applied in the equipment side, comprising: sending a screen practice verification request to a server before screen printing by the equipment, in which the verification request includes: a first identification of a screen and a second identification of equipment, so that the server can inquire a prestored database according to the first identification and the second identification and acquire a first attribute value of the screen and a second attribute value of the equipment; and receiving a verification result sent by the server after the server verifies whether the screen satisfies the practice condition according to the first attribute value and the second attribute value, and doing corresponding operation according to the verification result.

For example, the screen control method in the embodiments of this disclosure, sends a screen practice verification request to a server before screen printing by the equipment, receives a verification result sent by the server after the server verifies whether the screen satisfies the practice condition according to the first attribute value and the second attribute value.

In order to achieve the objective, third aspect of embodiments in this disclosure provides a server, comprising: a memory and a processor, wherein computer program instructions are stored in the memory; and the processor executes the following operations when processing the instructions: receiving a screen practice verification request sent by equipment before screen printing by the equipment, in which the verification request includes: a first identification of a screen and a second identification of equipment; inquiring a prestored database according to the first identification and the second identification, and acquiring a first attribute value of the screen and a second attribute value of the equipment; verifying whether the screen satisfies the practice condition according to the first attribute value and the second attribute value; and sending a verification result to the equipment, so that the equipment can do corresponding operation according to the verification result.

For example, the server in the embodiments of this disclosure, receives a screen practice verification request sent by equipment before screen printing by the equipment, inquires a prestored database according to the first identification and the second identification, acquires a first attribute value of the screen and a second attribute value of the equipment; verifies whether the screen satisfies the practice condition according to the first attribute value and the second attribute value; and sends a verification result to the equipment, so that the equipment can do corresponding operation according to the verification result.

For example, in an embodiment of this disclosure, the first receiving module is configured to receive the screen practice verification request sent by an Equipment Interface Server, in which the Equipment Interface Server receives the first identification and the second identification sent by the equipment.

For example, in an embodiment of this disclosure, the first sending module includes: first inquiring module, configured to inquiring the database according to the first identification and acquiring a current use frequency of the screen after verifying and knowing that the screen satisfies the practice condition; first sending module, configured to send the current use frequency of the screen to the equipment, so that the equipment can cumulatively count the use frequency of the screen by taking the current use frequency as the start; updating module, configured to receive a final use frequency uploaded by the equipment after the use of the screen, and updating synchronously in the database.

For example, in an embodiment of this disclosure, the first sending module includes: second acquiring unit, used to inquire the database according to the first identification, and acquire an alarm use frequency of the screen; second sending unit, used to send the alarm use frequency of the screen to the equipment, so that the equipment can determine whether the current use frequency reaches the alarm use frequency; first receiving unit, used to receive replacement alarm information sent by the equipment after the equipment determines and knows that the current use frequency reaches the alarm use frequency; and third sending unit, used to send the replacement alarm information to a monitor terminal, so that he monitor terminal can display the replacement alarm information to operators.

For example, in an embodiment of this disclosure, wherein, the first sending module includes: third acquiring unit, used to inquire the database according to the first identification, and acquire an extreme use frequency of the screen; forth sending unit, used to send the extreme use frequency of the screen to the equipment, so that the equipment can determine whether the current use frequency reaches the extreme use frequency; the second receiving unit, used to receive crash alarm information sent by the equipment when the equipment determines and knows that the current use frequency reaches the extreme use frequency; and fifth sending unit, used to send the crash alarm information to the monitor terminal, so that the monitor terminal can display the crash alarm information.

In order to achieve the objective, the forth aspect of embodiments in this disclosure provides a device, comprising: second sending module, used to send a screen practice verification request to a server before screen printing by an equipment, in which the verification request includes: a first identification of a screen and a second identification of equipment, so that the server can inquire a prestored database according to the first identification and the second identification and acquire a first attribute value of the screen and a second attribute value of the equipment; and second receiving module, used to receive a verification result sent by the server after the server verifies whether the screen satisfies the practice condition according to the first attribute value and the second attribute value, and doing corresponding operation according to the verification result.

For example, the device in the embodiments of this disclosure, sends a screen practice verification request to a server before screen printing by an equipment, and receives a verification result sent by the server after the server verifies whether the screen satisfies the practice condition according to the first attribute value and the second attribute value, and doing corresponding operation according to the verification result.

In order to achieve the objective, the fifth aspect of embodiments in this disclosure provides a screen control system, comprising: the server in the third aspect of embodiments and the equipment in the forth aspect of embodiments.

For example, the screen control system further comprising: an equipment interface server configured to receive the first identification and the second identification sent by the equipment, generate the screen practice verification request according to the first identification and the second identification, and send the screen practice verification request to the server.

Parts of additional aspects and advantages of the present invention will be given in the following description, and parts will be apparent from the following description or known from the practice of the present invention.

BRIEF DESCRIPTION OF THE DRAWINGS

The above and/or additional aspects and advantages of the present invention will be apparent and easily understood in the following description of the embodiments with reference to the accompanying drawings.

FIG. 8 is a flow chart illustrating the process of screen practice verification in one embodiment of the present invention;

FIG. 9 is a flow chart of a screen control method provided by the sixth embodiment of the present invention;

DETAILED DESCRIPTION

The embodiments of this disclosure will be described in detail in the following; the examples of the embodiments are illustrated in the figures, wherein from beginning to end, the same or similar reference number indicates the same or similar component or component with same or similar functions. The following embodiments described referring to figures are examples, aiming to explain this disclosure, and should not be regarded as a limitation of this disclosure.

Description will be given below to the screen control method and system and the equipment thereof, provided by the embodiment of the present invention, with reference to the accompanying drawings.

It should be noted that the following embodiments are respectively described from the server side and the equipment side for more comprehensive description of the screen control method provided by the embodiment of the present invention.

Firstly, description is given from the application of the screen control method in the server side.

Figure 1:
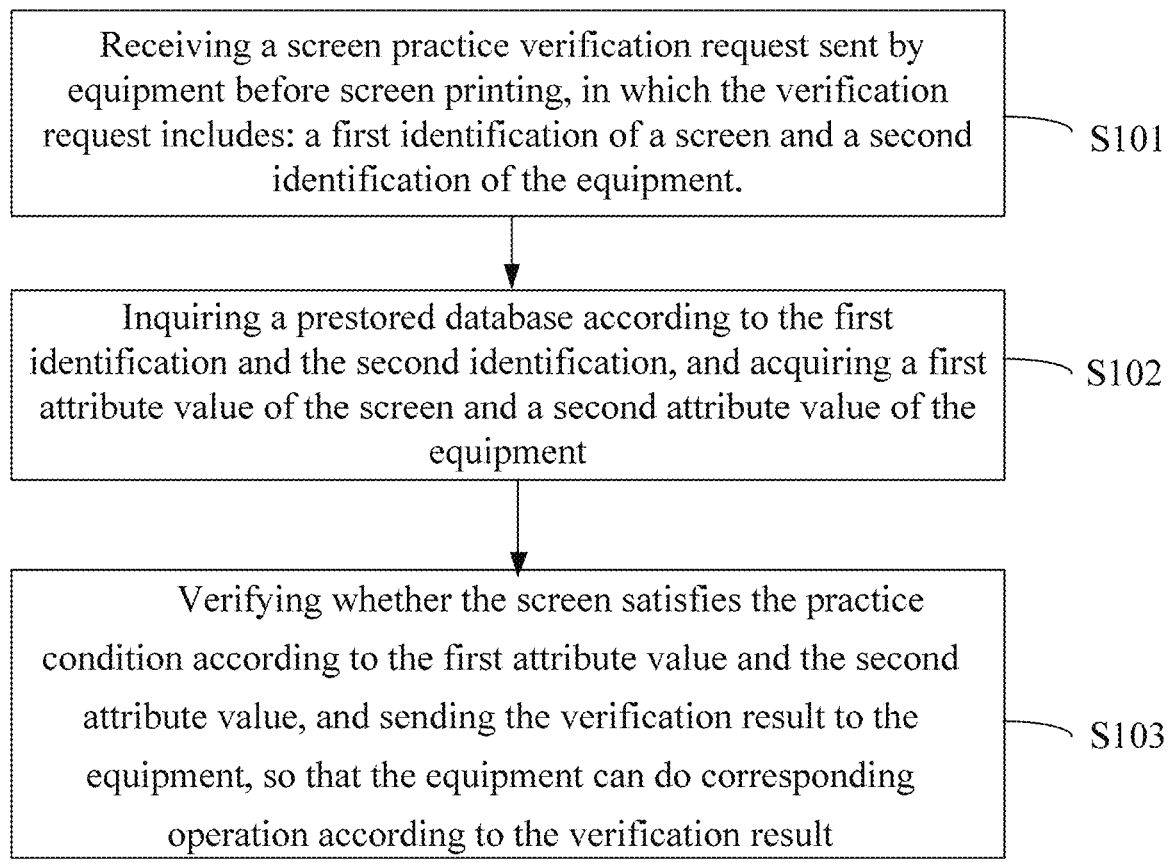
FIG. 1 is a flow chart of a screen control method provided by the first embodiment of the present invention.

FIG. 1 is a flow chart of a screen control method provided by the first embodiment of the present invention;

As illustrated in FIG. 1, the screen control method comprises:

S101: receiving a screen practice verification request sent by equipment before screen printing, in which the verification request includes: a first identification of a screen and a second identification of the equipment.

Wherein, the first identification of the screen is used for indicating the uniqueness of the screen and may include: a screen manufacturer field, a product size field, a product type field, a production type field, a printing process field, a version number field, a serial number field, etc.

It should be noted that each field of the first identification may have various different expression modes, and the first identification formed by the plurality of fields can ensure high recognizability and large information amount of the screen.

Figure 2:
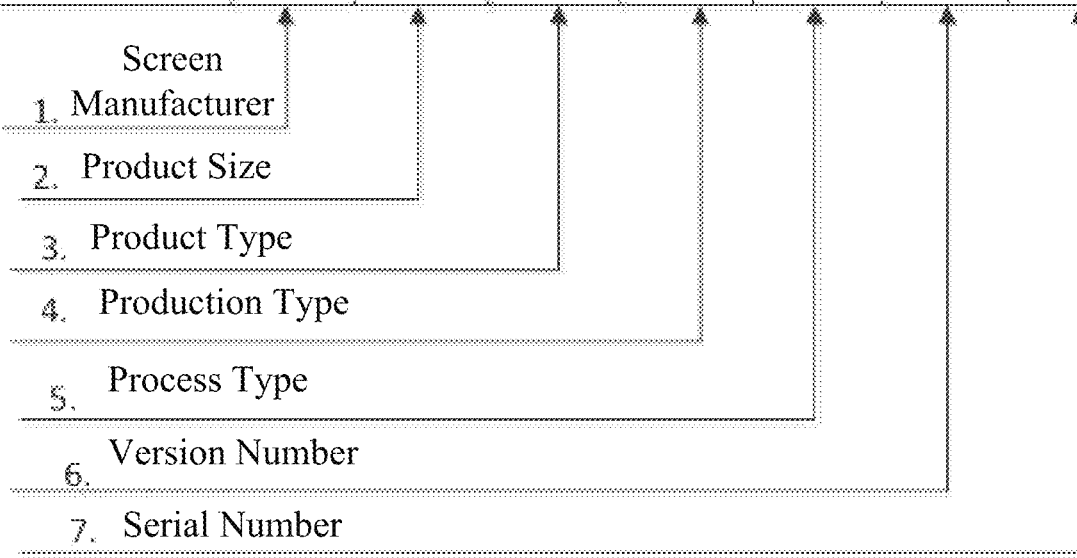
FIG. 2 is a schematic diagram illustrating the naming rule of a first identification of a screen in one embodiment of the present invention.

As a possible implementation, as shown in FIG. 2, the first identification of the screen may include 7 subfields, each of the subfield includes 13-bit. As shown in FIG. 2, the screen manufacturer field may be represented by a capital letter, for example, the letter Z is used to represent the screen manufacturer, or the letter D is used to represent the screen manufacturer; the product size field may be represented by three digits, for example, the field 101 is used to represent a 10.1-inch product; the product type field may be uniquely confirmed by two letters; the production type field may be represented by a capital letter, e.g., M for mass production, E for EN product, T for test product, D for development product; the printing process field may be represented by a capital letter, e.g., the initial of the process IR is I and the S-surface strippable glue is represented by S; in the version number field, the first version may be designed to be P0, the 1st revision being P1, the 2nd revision being P2; and in the serial number field, the 1st block of the same type and the same version may be 001, the 2nd block being 002.

The second identification of the equipment is used for identifying the uniqueness of the equipment and may include the production code of the equipment, the equipment name, the production date of the equipment, etc.

For instance, in relevant art, before the screen is put in use on the machine, in order to determine whether the screen satisfies the practice request, manual inspection is entirely implemented, so the operation is cumbersome, consumes a lot of time, and can easily lead to the misjudgment of manual inspection. Therefore, in the embodiment, whether the screen satisfies the practice request is automatically determined, so the determination efficiency and the accuracy can be improved.

For example, the screen practice verification request sent by the equipment is received before screen printing, so as to determine whether the screen satisfies the practice condition according to the first identification of the screen and the second identification of the equipment in the verification request.

It should be noted that the means of the equipment in sending the screen practice verification request is different in different applications, and examples are as follows.

First example: the equipment and the server are directly connected. For instance, if both the equipment and the server include a WIFI communication module, the equipment and the server get WIFI connection. For instance, if both the equipment and the server include a Bluetooth communication module, the equipment and the server get Bluetooth connection. Moreover, the equipment sends the practice verification request to the screen through a communication link of the server.

Second example: the equipment and the server are connected with each other through another server. The other server is taken as a "bridge" to achieve the connection between the equipment and the server.

In the example, the other server may be an Equipment interface server (EIS). Thus, the equipment sends the first identification and the second identification to the EIS, for example, sent through high-speed SECS message services (HSMS). Therefore, as for the step of receiving the first identification and the second identification sent by the equipment, as a possible implementation, if the EIS and the server are communicated with each other through a middleware, the EIS will encapsulate the verification request into an XML format recognizable by the middleware and send the screen practice verification request encapsulated into the XML format to the server.

Of course, in the example, the communication modes of the equipment and the EIS are also different in different applications. For example, the equipment and the EIS may be directly communicated. Moreover, for instance, the equipment is communicated with the EIS through a mediserver. For example, the equipment is communicated with the EIS through an equipment controller.

S102: inquiring a prestored database according to the first identification and the second identification, and acquiring a first attribute value of the screen and a second attribute value of the equipment.

Wherein, the first attribute value includes parameter values indicating the ability of the screen to provide a functional service, e.g., the product type, the service life and the initial tension value of the screen; and the second attribute value includes the process service type supportable by the equipment.

It should be understood that the corresponding relationship between the first identification and the first attribute value and the corresponding relationship between the second identification and the second attribute value are prestored in the database, so the database is inquired after the first identification and the second identification are acquired and the first attribute value of the screen and the second attribute value of the equipment are acquired.

S103: verifying whether the screen satisfies the practice condition according to the first attribute value and the second attribute value, and sending the verification result to the equipment, so that the equipment can do corresponding operation according to the verification result.

For instance, before the screen is put in use on the machine, the screen can provide normal service after put on the machine and the quality of the provided service can be guaranteed only by determining that the functional service of the screen is supported by the equipment, the screen being not dirty, the tension value of the screen being qualified, etc. For example, whether the screen satisfies the practice condition is verified according to the first attribute value and the second attribute value, and the verification result is sent to the equipment.

For more clear description, description will be given below to how to verify whether the screen satisfies the practice condition according to the first attribute value and the second attribute value by taking the determination process of the initial tension value of the screen, the product type of the screen and the process type of the equipment as an example.

It should be understood that the following examples are only provided for those skilled in the art to more clearly understand how to verify whether the screen satisfies the practice condition according to the first attribute value and the second attribute value. In the process of actually verifying whether the screen satisfies the practice condition, other determination behaviors such as the determination of the dirty degree of the screen and the hardware state may also be included. No further description will be given here.

In one example, the initial tension value of the screen is acquired from the first attribute value, and whether the initial tension value falls within the preset range is determined, in which the preset range is the range of the initial tension value, within which the screen can provide normal service, calibrated according to a large number of experiments. Thus, if the initial tension value of the screen is within the preset range, it is determined that the screen satisfies the practice condition, or else, the screen does not satisfy the practice condition. In another example, the product type of the screen is acquired from the first attribute value, and the process type of the equipment is acquired from the second attribute value; whether the product type and the process type are matched is determined; and whether the service supported by the equipment and the service provided by the screen are consistent is verified. Thus, if the product type and the process type are matched, it is determined that the screen satisfies the practice condition, or else, the screen does not satisfy the practice condition.

In some applications, whether the screen satisfies the practice condition may be determined in combination with a plurality of screen parameters acquired according to the first attribute value and the second attribute value. In some other applications, whether the screen satisfies the practice condition may be determined in combination with a single screen parameter acquired according to the first attribute value and the second attribute value. For example, in some applications, whether the screen satisfies the practice condition may be determined in combination with the initial tension value of the screen, the product type of the screen and the process type of the equipment. In some other applications, whether the screen satisfies the practice condition may be determined only according to the initial tension value of the screen or only according to the product type of the screen and the process type of the equipment.

Moreover, for the operators to know whether the screen satisfies the practice condition in time, the verification result is sent to the equipment. Wherein, if it is verified that the screen satisfies the practice condition, the verification success result is sent to the equipment to indicate the operator that the current screen satisfies the practice condition and may be put in use on the machine, so the next operation can be implemented in time, and hence the production efficiency can be improved. Wherein, if it is verified that the screen does not satisfy the practice condition, the verification failure result is sent to the equipment to indicate the operator to replace the screen in time.

Therefore, in the screen control method provided by the present invention, whether the screen satisfies the practice condition is automatically verified by information verification method. Thus, the screen not satisfying the practice condition is strictly controlled, so as to avoid the production of products with poor quality, improve the product yield, and improve the efficiency and the accuracy of the valid verification of whether the screen satisfies the practice condition.

In summary, in the screen control method provided by the embodiment of the present invention, the screen practice verification request sent by the equipment is received before screen printing; the prestored database is inquired according to the first identification of the screen and the second identification of the equipment in the equipment verification request; the first attribute value of the screen and the second attribute value of the equipment are acquired; whether the screen satisfies the practice condition is verified according to the first attribute value and the second attribute value; and the verification result is sent to the equipment, so that the equipment can do corresponding operation according to the verification result. Thus, the embodiment realizes the automated verification of whether the screen satisfies the practice condition, improves the verification efficiency and accuracy, and effectively ensures the product yield.

Based on the above embodiments, in order to further improve the automation of the management and control of the screen and improve the production efficiency, the service life of the screen may also be subjected to informatization management.

In relevant art, due to the limited use frequency of the screen, in order to ensure that the screen can be replaced in time and the manufacturing schedule cannot be slowed down, in the use of the screen in the equipment, after the screen is used each time, relevant operators must handwrite data on the equipment, so the operation is cumbersome and can easily lead to human error.

In order to solve the above problem, in the screen control method provided by the present invention, the service life of the screen is subjected to synchronous management.

Figure 3:
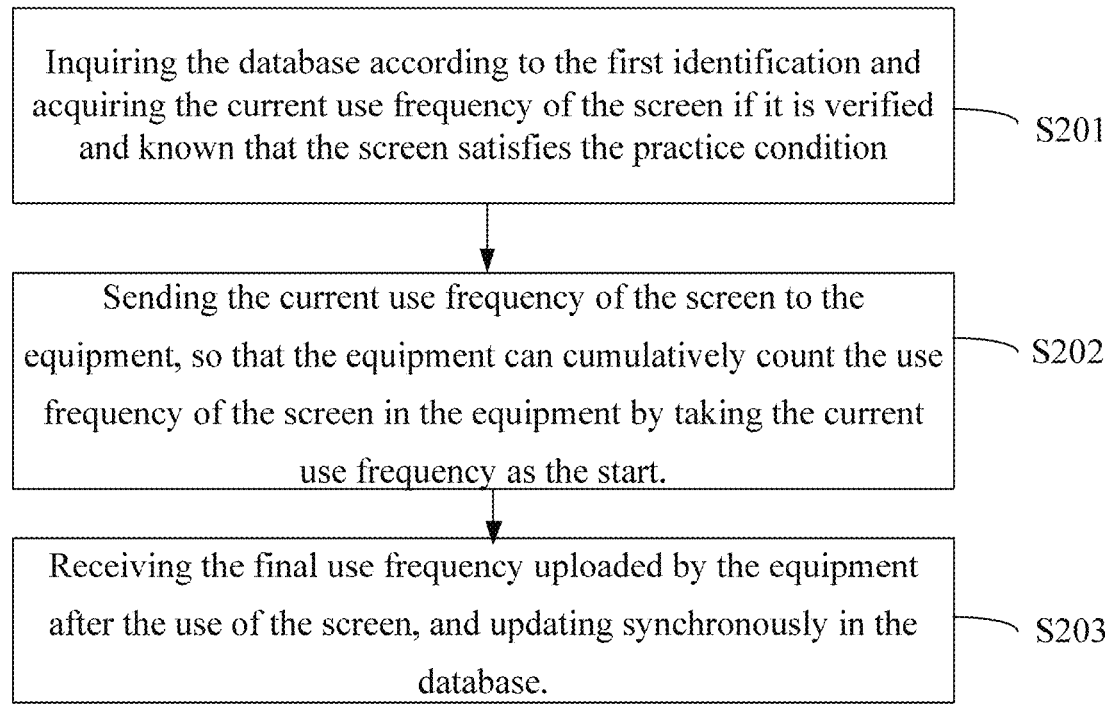
FIG. 3 is a flow chart of a screen control method provided by the second embodiment of the present invention.

For example, FIG. 3 is a flow chart of a screen control method provided by the second embodiment of the present invention. As illustrated in FIG. 3, after the above step S103, the method further comprises:

S201: inquiring the database according to the first identification and acquiring the current use frequency of the screen if it is verified and known that the screen satisfies the practice condition.

It should be understood that the corresponding relationship between the first identification and the current use frequency of the screen is prestored in the database.

For instance, if it is verified and known that the screen satisfies the practice condition, the database is inquired according to the first identification, and the current use frequency of the screen is acquired, so as to easily know that the current screen does printing service in which time.

S202: sending the current use frequency of the screen to the equipment, so that the equipment can cumulatively count the use frequency of the screen in the equipment by taking the current use frequency as the start.

For instance, after the current use frequency of the screen is acquired, the service life of the screen is subjected to synchronous management, and the current use frequency of the screen is sent to the equipment, so that the equipment can cumulatively count the use frequency of the screen in the equipment by taking the current use frequency as the start.

For example, the current use frequency of the screen is known to be the 50th time according to the first identification of the screen, and the use frequency of the screen is sent to the equipment, so that the equipment can cumulatively count the use frequency of the screen in the equipment beginning from the 50th time. Thus, relevant operators do not need to handwrite the frequency after the use of the screen each time, and the equipment automatically and cumulatively counts the frequency on the basis of the current use frequency of the screen, so the efficiency is high and the accuracy is high.

S203: receiving the final use frequency uploaded by the equipment after the use of the screen, and updating synchronously in the database.

For example, after the use of the screen, the final use frequency uploaded by the equipment after the use of the screen is received and synchronously updated in the database. Thus, the current use frequency of the screen stored in the database is consistent with the actual use frequency of the screen.

It should be noted that if the current screen is used for the first time, the current use frequency of the screen stored in the database is 0.

Based on the above description, it should be understood that in relevant art, when the screen is about to reach the life expectancy, the operators cannot be reminded in time to replace the screen, resulting in the delay of the production time and low activation of the equipment. In the embodiment of the present invention, in order to further improve the production efficiency and ensure that the screen can be replaced in time, the critical-points method may also be adopted to provide replacement alarm for relevant operators when the service life of the screen approaches the life expectancy.

Figure 4:
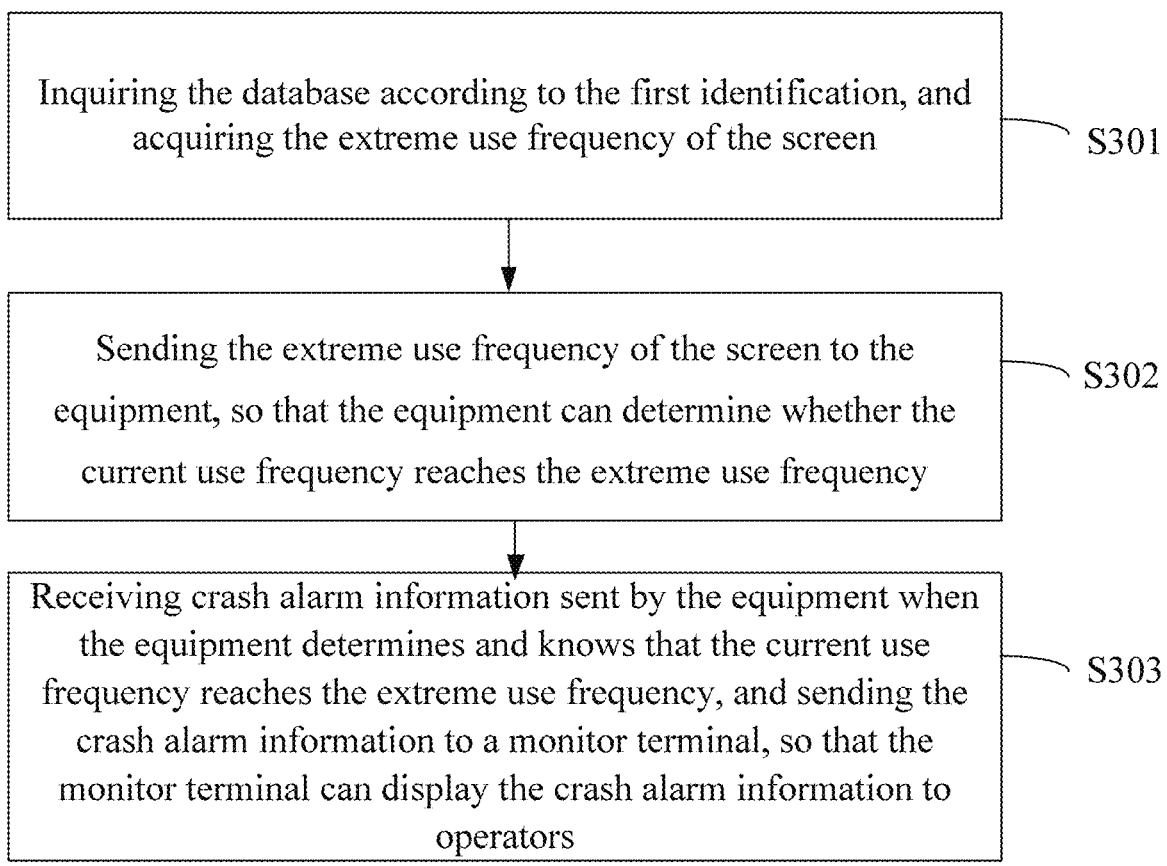
FIG. 4 is a flow chart of a screen control method provided by the third embodiment of the present invention.

FIG. 4 is a flow chart of a screen control method provided by the third embodiment of the present invention. As illustrated in FIG. 4, after the above step S202, the screen control method comprises:

S301: inquiring the database according to the first identification, and acquiring the alarm use frequency of the screen.

As the screen is the main consumables in the screen printing process of touch panel factories, when the screen reaches the service life, the production of touch panels will be interrupted. Therefore, in order to improve the production efficiency and ensure that the screen can be replaced in time, in the embodiment of the present invention, the alarm use frequency of the screen is preset, in which the alarm use frequency is a value close to the service life frequency of the screen. The service life threshold may be calibrated by a system and may also be calibrated by operators according to the production pattern. Wherein, the operator may finish the replacement operation of the screen within the time from the alarm use frequency of the screen to the service life of the screen.

Thus, after the first identification of the screen is acquired, the database is inquired according to the first identification, and the alarm use frequency of the screen is acquired.

S302: sending the alarm use frequency of the screen to the equipment, so that the equipment can determine whether the current use frequency reaches the alarm use frequency.

For instance, the alarm use frequency of the screen is sent to the equipment, so that the equipment can determine whether the current use frequency reaches the alarm use frequency. For example, if the current use frequency of one screen is N times and the alarm use frequency of the screen is M times, determination is made according to the case whether the accumulated current use frequency N of the screen reaches M times, in which both N and M are positive integers, and N is less than M.

S303: receiving replacement alarm information sent by the equipment after the equipment determines and knows that the current use frequency reaches the alarm use frequency, and sending the replacement alarm information to a monitor terminal, so that the monitor terminal can display the replacement alarm information to operators.

For instance, when it is determined that the screen reaches the alarm use frequency, the replacement alarm information is sent to the server, and then the replacement alarm information is sent to the monitor terminal to indicate the operator to replace the screen in time, thus avoiding the delay of the production time and improving the production activation.

Of course, in actual use, it is also possible that the operator cannot replace the screen in time when the alarm use frequency is reached. At this point, in order to prevent the screen from damaging relevant equipment and resulting in resource waste when reaching the service life, the equipment is down, and relevant operators are reminded to replace the screen as soon as possible, so as to reduce the delay of the production time.

Figure 5:
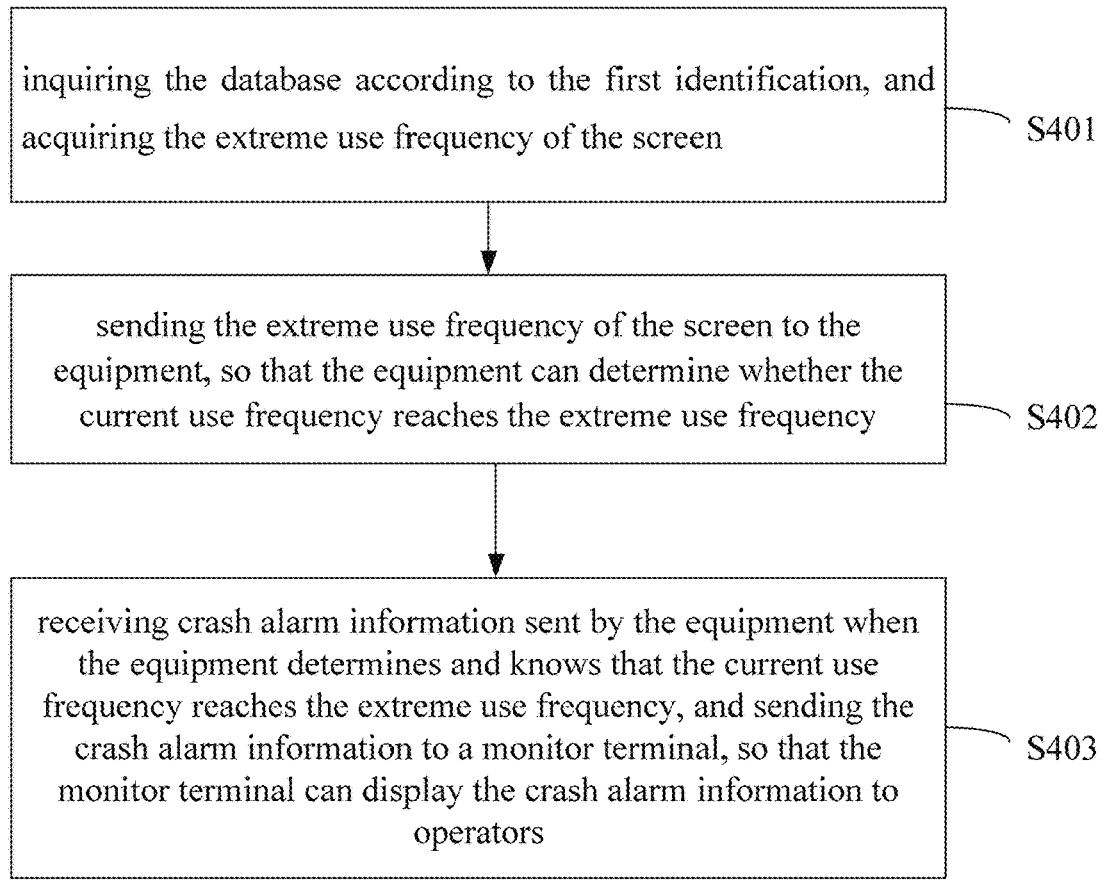
FIG. 5 is a flow chart of a screen control method provided by the fourth embodiment of the present invention.

FIG. 5 is a flow chart of a screen control method provided by the fourth embodiment of the present invention. As illustrated in FIG. 5, after the above step S202, the screen control method comprises:

S401: inquiring the database according to the first identification, and acquiring the extreme use frequency of the screen.

In the embodiment of the present invention, the extreme use frequency of the screen is preset, in which the extreme use frequency of the screen is the service life frequency of the screen, and the extreme use frequency of the screen is relevant to the specific model of the screen and may be calibrated by manufacturers.

Of course, in actual production process, in order to further protect relevant equipment, the calibrated error of the service life frequency of the screen is compensated. For example, the service life frequency of the screen calibrated by the manufacturer is N times, but due to the influence of the factors such as the abrasion of the screen in the use process and the change of the climate, the actual service life frequency may be reduced. Therefore, the extreme use frequency may be slightly less than the service life frequency of the screen.

S402: sending the extreme use frequency of the screen to the equipment, so that the equipment can determine whether the current use frequency reaches the extreme use frequency.

For instance, the extreme use frequency of the screen is sent to the equipment, so that the equipment can determine whether the current use frequency reaches the extreme use frequency. For example, if the current use frequency of one screen is N times and the extreme use frequency of the screen is M times, the equipment determines the values N and M, in which N and M are positive integers.

S403: receiving crash alarm information sent by the equipment when the equipment determines and knows that the current use frequency reaches the extreme use frequency, and sending the crash alarm information to a monitor terminal, so that the monitor terminal can display the crash alarm information to operators.

For instance, when it is determined that the screen reaches the extreme use frequency, the crash alarm information is sent to the server, and then the crash alarm information is sent to the monitor terminal to indicate the operator that the current equipment has been down and the screen must be replaced in time, thus avoiding the delay of the production time and improving the production activation.

Therefore, in the screen control method provided by the embodiment of the present invention, the information synchronization method is adopted to realize the management of the service life of the screen, so that the frequency of the screen before and after use can be updated and stored in time. The embodiment solves the technical problem that the use frequency of the screen cannot be automatically acquired in the use process. Compared with the manual copy of the use frequency, the accuracy and the efficiency are higher.

Moreover, the present invention adopts the critical-points method for the prewarning management of the screen which is about to reach the service life, and operators are reminded to replace the screen in time. The embodiment solves the technical problem of production delay as the screen cannot be replaced in time in the use process, and improves the equipment activation.

In summary, in the screen control method provided by the embodiment of the present invention, the service life of the screen is subjected to synchronous management, and replacement or crash alarm is made according to the service life frequency of the screen, which realizes the informatization management of the service life of the screen. And the operators are reminded in time to replace the screen, so as to avoid the delay of the production time and improve the equipment activation.

Secondly, description is given from the application of the screen control method in the equipment side.

Figure 6:
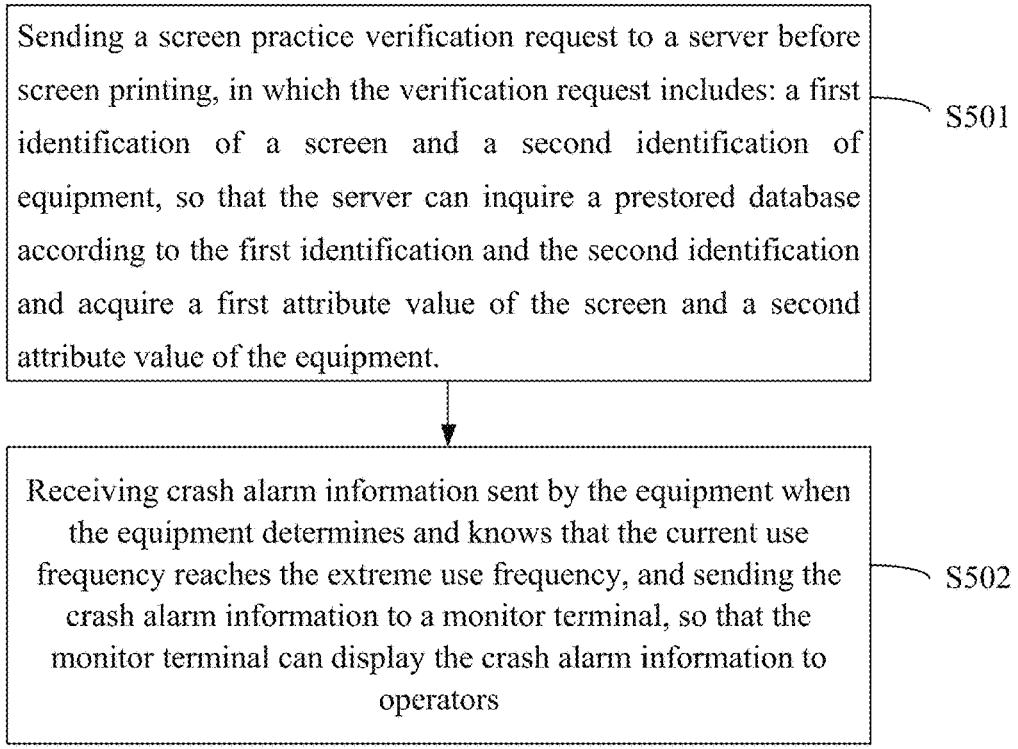
FIG. 6 is a flow chart of a screen control method provided by the fifth embodiment of the present invention.

FIG. 6 is a flow chart of a screen control method provided by the fifth embodiment of the present invention. As illustrated in FIG. 6, the screen control method comprises:

S501: sending a screen practice verification request to a server before screen printing, in which the verification request includes: a first identification of a screen and a second identification of equipment, so that the server can inquire a prestored database according to the first identification and the second identification and acquire a first attribute value of the screen and a second attribute value of the equipment.

Wherein, the first identification of the screen may include a screen manufacturer field, a product side field, a product type field, a production type field, a printing process field, a version number field, a serial number field, etc. Thus, the recognizability and the uniqueness of the screen can be guaranteed through the first identification of the screen formed by the plurality of fields.

Wherein, due to the difference of the expression forms of the first identification of the screen, the means of the equipment in acquiring the first identification of the screen is different. As a possible implementation, if the first identification of the screen is expressed in the form of a bar code label, the equipment acquires the first identification of the screen by scanning the bar code label of the screen through a device such as a camera.

It should be noted that the means of the equipment in sending the screen practice verification request is different in different applications. For example, the equipment may send the practice verification request to the server through a communication link after the equipment and the server create the communication link through a wireless connection module.

Moreover, for instance, for the stability of connection and the like, another server may also be introduced. The other server is taken as a "bridge" for the communication between the equipment and the server to realize information interaction of both.

In the example, the other server may be an EIS (Equipment interface server). The EIS and the server achieve information interaction through a middleware. That is to say, the equipment acquires the first identification of the screen and the second identification of the equipment, and then sends the first identification and the second identification to the EIS through HSMS(High-Speed Message Service), so that the EIS can encapsulate the first identification and the second identification into XML format recognizable by the middleware, generate the screen practice verification request, and send the screen practice verification request to the server.

Wherein, the connection modes between the equipment and the EIS may also be different in different applications, for example, may be directly connected through a wireless module. Moreover, for instance, relevant server may be introduced, and communication is realized through relevant server.

Figure 7:
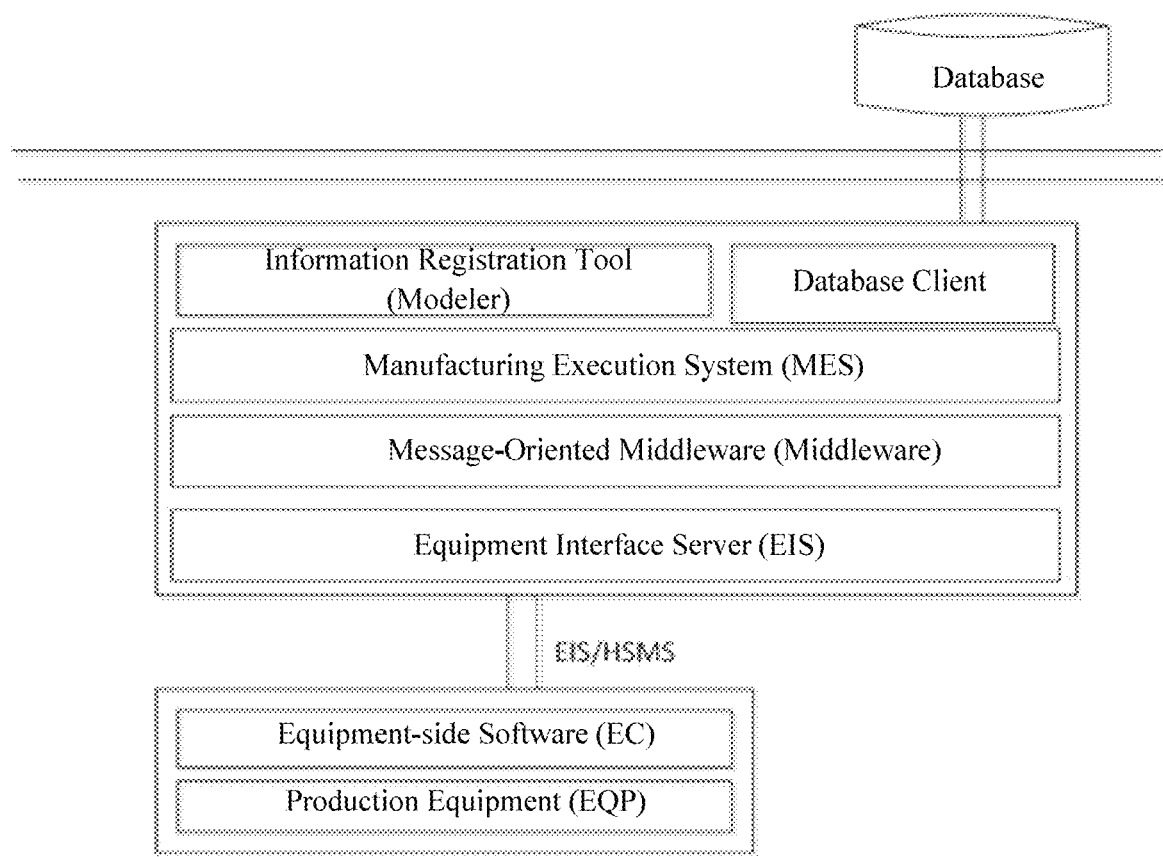
FIG. 7 is a schematic diagram illustrating the architecture of screen control software in one embodiment of the present invention.

In order to more clearly describe the communication between the equipment and the server, description will be given below with reference to the screen control software architecture as shown in FIG. 7. In the example, for clear description, the server is represented by a production server; the equipment and the server are communicated with each other through the EIS; and the equipment and the EIS are communicated with each other through an equipment controller.

With reference to FIG. 7, relevant information of the screen and the equipment registered through an information registration tool is prestored in the database. Thus, the equipment sends the first identification of the screen and the second identification of the equipment to the equipment controller before screen printing, so that the equipment controller can send the first identification and the second identification to the EIS through HSMS.

And then, the EIS encapsulates the first identification and the second identification into XML format through a message-oriented middleware and sends the first identification and the second identification to a manufacturing execution system (MES), so that the MES can realize the background logic processing of data through a database client and the database.

S502: receiving a verification result sent by the server after the server verifies whether the screen satisfies the practice condition according to the first attribute value and the second attribute value, and doing corresponding operation according to the verification result.

For instance, for the operators to easily know the verification result of the screen in time, the verification result, sent by the server after the server verifies whether the screen satisfies the practice condition according to the first attribute value and the second attribute value, is received.

In one embodiment of the present invention, the server verifies that the screen satisfies the practice condition according to the first attribute value and the second attribute value, and a verification success result, sent by the server when the server verifies and knows that the screen satisfies the practice condition, is received to indicate the operator that the screen can be put in use on the machine.

In one embodiment of the present invention, the server verifies that the screen does not satisfy the practice condition according to the first attribute value and the second attribute value, and a verification failure result, sent by the server when the server verifies and knows that the screen does not satisfy the practice condition, is received to indicate the operator to replace the screen.

In order to more clearly describe the screen control method provided by the embodiment of the present invention, description will be given below to the operation process of screen practice verification in the embodiment of the present invention by taking the following as an example: the server is described as a production server; the equipment and the server are communicated with each other through the EIS; and the equipment and the EIS are communicated with each other through the equipment controller. Wherein, the information interaction process between the equipment and the equipment controller is not shown in the figure.

In the flow chart illustrating the process of screen practice verification as shown in FIG. 8, after a screen A is put on the equipment, the equipment acquires a first identification of the screen by scanning an identification code posted on the screen A (S601), and the equipment controller sends information such as the first identification of the screen, the second identification of the equipment and the current process type of the equipment to the EIS (S602).

And then, the EIS encapsulates the information into XML format recognizable by an message-oriented middleware (S603), and sends the information to an MES (Manufacturing Execution System) (S604). The MES acquires the attribute value of the screen from the database according to the first identification of the screen A after receiving the information. These attribute values include the product type, the service life, the initial tension value and the like of the screen A. The attribute values must be registered in advance in a background database of the MES (S605).

The MES verifies whether the attribute value of the screen A satisfies the practice request, more specifically, whether the tension value of the screen is within the preset range, and whether the screen is successfully matched with the current equipment and process (S606). Thus, in the case of verification failure, the MES will feed back the verification result and the failure reason to the EIS (S607), so that the EIS can send the verification result to the equipment side (S608). The equipment side indicates the operator to replace the screen A after receiving the feedback result of verification failure (S609).

Wherein, in the case of verification success, it indicates that the screen A satisfies the practice condition, and the MES will feed back the result to the EIS (S610), so that the EIS can send the verification result to the equipment side, and then the screen A can be put into use (S611).

It should be noted that the foregoing screen control method described on the server side corresponds to the screen control method described on the equipment side. No further description will be given to those details not disclosed in the embodiment.

In summary, in the screen control method provided by the embodiment of the present invention, the equipment sends the screen practice verification request to the server before screen printing, and receives the verification result sent by the server after the server verifies whether the screen satisfies the practice condition according to the first attribute value and the second attribute value. Thus, the embodiment realizes the automation of the verification whether the screen satisfies the practice condition, improves the verification efficiency and accuracy, and effectively guarantees the product yield.

Based on the above embodiment, in order to further improve the automation of screen control and improve the production efficiency, the service life of the screen may also be subjected to informatization management.

In relevant art, due to limited use frequency of the screen, in order to ensure that the screen can be replaced in time and the manufacturing schedule cannot be slowed down, in the use of the screen in the equipment, after the screen is used each time, relevant operators must handwrite data on the equipment, so the operation is cumbersome and can easily lead to human error.

In order to solve the above problem, in the screen control method provided by the present invention, the service life of the screen is subjected to synchronous management.

For example, FIG. 9 is a flow chart of a screen control method provided by the sixth embodiment of the present invention. As illustrated in FIG. 9, after the above step S502, the method further comprises:

S701: receiving the current use frequency of the screen sent by the server.

It should be understood that the corresponding relationship between the first identification and the current use frequency of the screen is prestored in the database.

S702: cumulatively counting the printing frequency of the screen in the equipment by taking the current use frequency as the start.

For instance, after the current use frequency of the screen is acquired, the service life of the screen is subjected to synchronous management, and the current use frequency of the screen is sent to the equipment, so that the equipment can cumulatively count the use frequency of the screen in the equipment by taking the current use frequency as the start.

S703: uploading the final use frequency to the server after the end of screen printing, so that the server can update the use frequency synchronously in the database.

For example, after the use of the screen, the final use frequency uploaded by the equipment after the use of the screen is received and synchronously updated in the database. Thus, the current use frequency of the screen stored in the database is consistent with the actual use frequency of the screen.

Based on the above description, it should be understood that in relevant art, when the screen is about to reach the life expectancy, the operator cannot be reminded in time to replace the screen, resulting in the delay of the production time and low activation of the equipment. In the embodiment of the present invention, in order to further improve the production efficiency and ensure that the screen can be replaced in time, the critical-points method may also be adopted to provide replacement alarm for relevant operators when the service life of the screen approaches the life expectancy.

Figure 10:
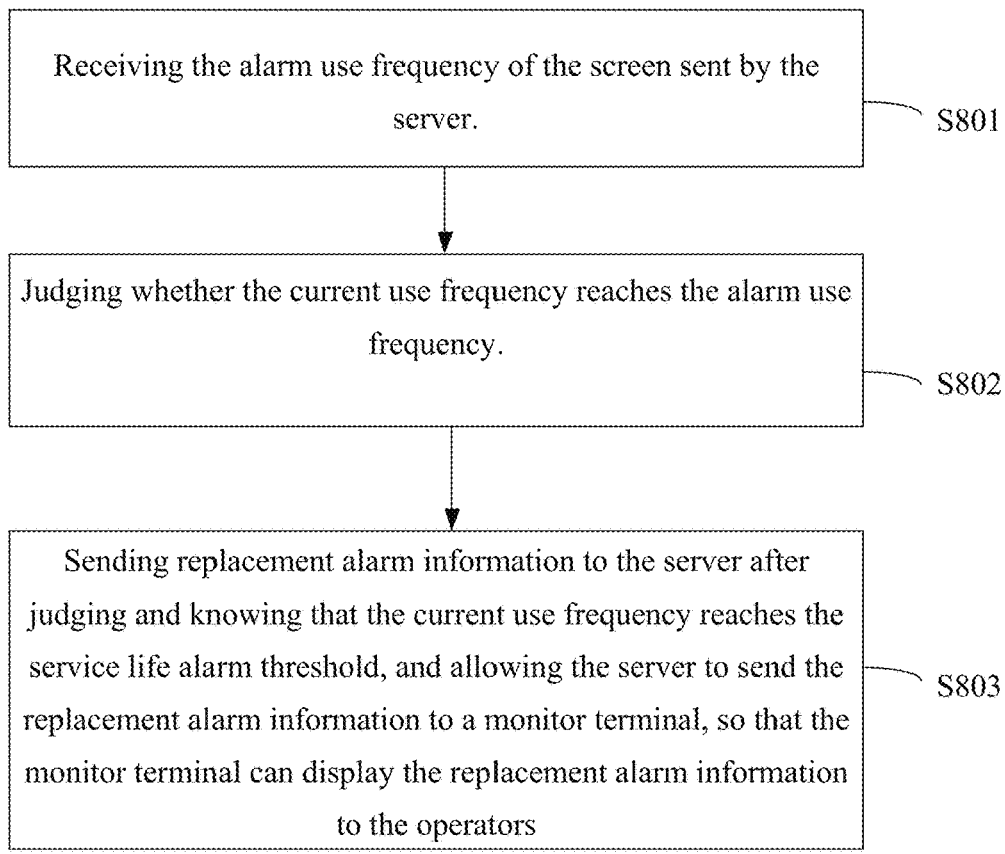
FIG. 10 is a flow chart of a screen control method provided by the seventh embodiment of the present invention.

FIG. 10 is a flow chart of a screen control method provided by the seventh embodiment of the present invention. As illustrated in FIG. 10, after the above step S702, the method further comprises:

S801: receiving the alarm use frequency of the screen sent by the server.

S802: determining whether the current use frequency reaches the alarm use frequency.

S803: sending replacement alarm information to the server after determining and knowing that the current use frequency reaches the service life alarm threshold, and allowing the server to send the replacement alarm information to a monitor terminal, so that the monitor terminal can display the replacement alarm information to the operators.

For instance, when it is determined that the screen reaches the alarm use frequency, the replacement alarm information is sent to the server, so that the server can send the replacement alarm information to the monitor terminal to indicate the operators to replace the screen in time, thus avoiding the delay of the production time and improving the production activation.

Of course, in actual use, it is also possible that the operator cannot replace the screen in time when the alarm use frequency is reached. At this point, in order to avoid the screen from damaging relevant equipment and resulting in resource waste when reaching the service life, the equipment is down, and relevant operators are reminded to replace the screen as soon as possible, so as to reduce the delay of the production time.

Figure 11:
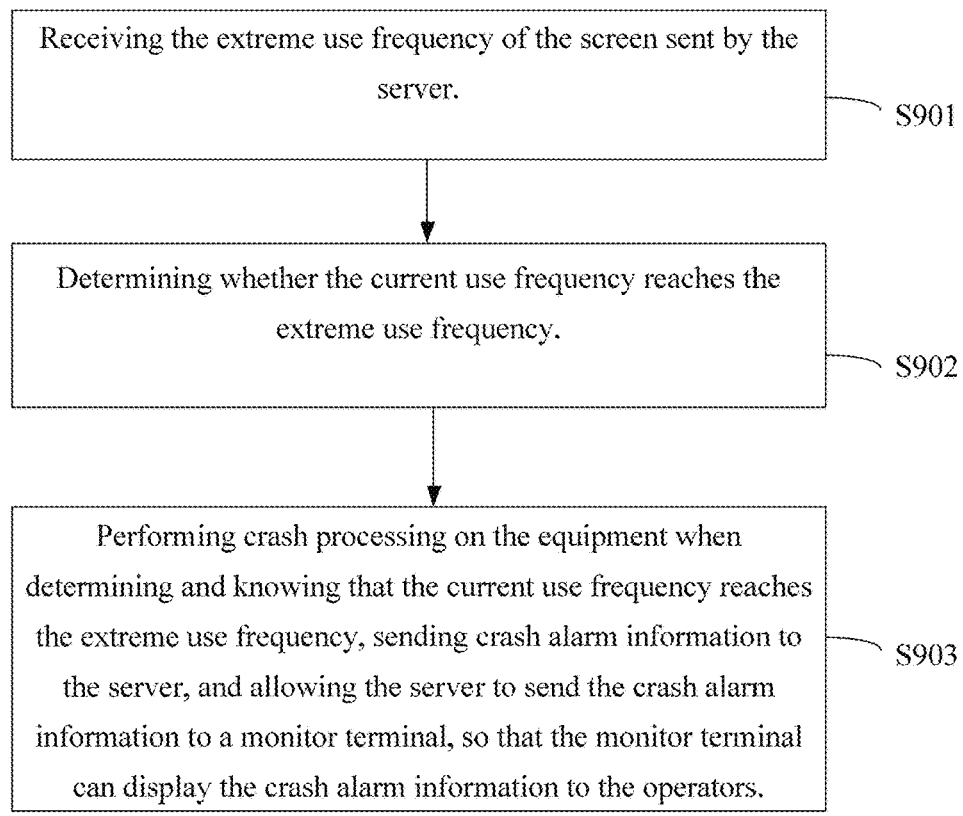
FIG. 11 is a flow chart of a screen control method provided by the eighth embodiment of the present invention.

FIG. 11 is a flow chart of a screen control method provided by the eighth embodiment of the present invention. As illustrated in FIG. 11, after the above step S702, the method further comprises:

S901: receiving the extreme use frequency of the screen sent by the server.

S902: determining whether the current use frequency reaches the extreme use frequency.

S903: performing crash processing on the equipment when determining and knowing that the current use frequency reaches the extreme use frequency, sending crash alarm information to the server, and allowing the server to send the crash alarm information to a monitor terminal, so that the monitor terminal can display the crash alarm information to the operators.

For instance, when it is determined that the use frequency of the screen reaches the extreme use frequency, in order to protect relevant equipment, crash processing such as electricity failure is performed on the equipment, and the crash alarm information is sent to the server, so that the server can send the crash alarm information to the monitor terminal to indicate the operators that the current equipment has been down and the screen must be replaced in time, thus avoiding the delay of the production time and improving the production activation.

In order to more clearly describe the screen control method provided by the embodiment of the present invention, description is given below to the operation process of the automated management of the service life of the screen in the embodiment of the present invention by taking the following as an example: the server is described as a production server; the equipment and the server are communicated with each other through the EIS; and the equipment and the EIS are communicated with each other through the equipment controller. Wherein, the information interaction process between the equipment and the equipment controller is not shown in the figure.

Figure 12:
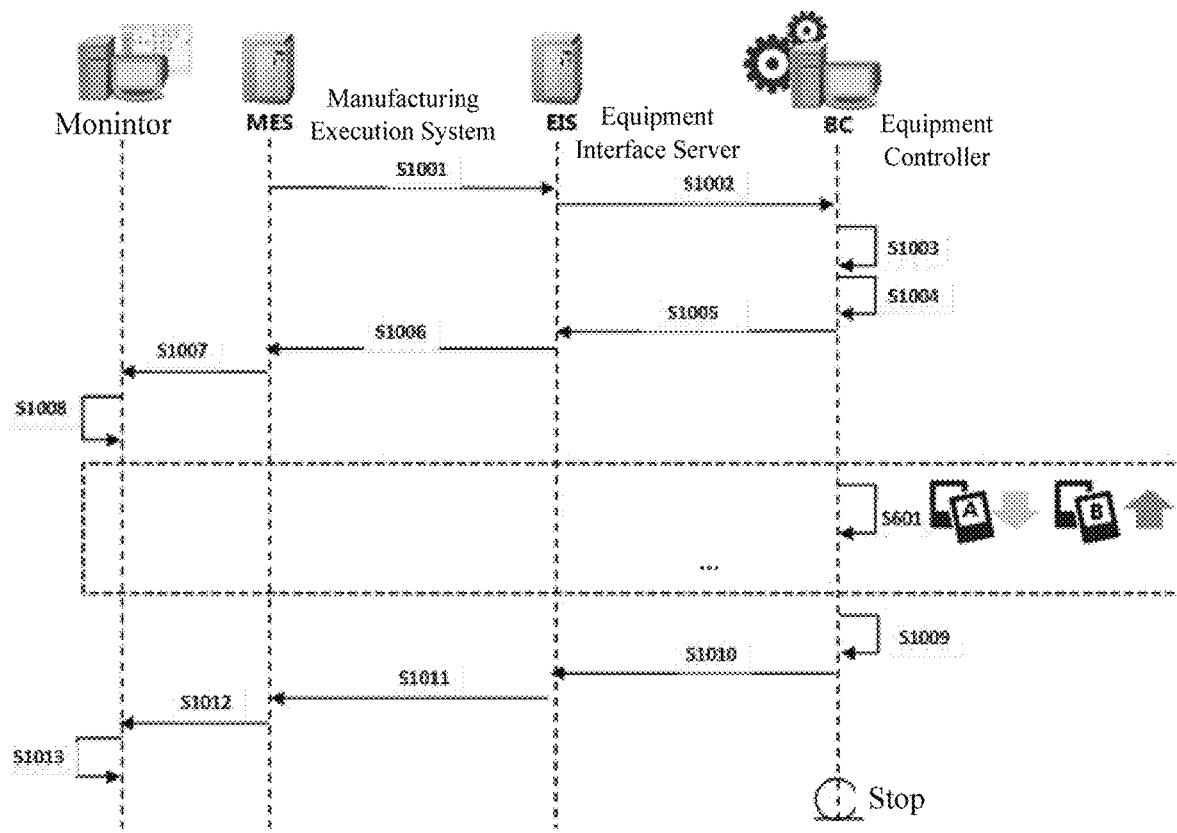
FIG. 12 is a flow chart illustrating the automated management of the service life of the screen in one embodiment of the present invention.

FIG. 12 is a flow chart illustrating the automated management of the service life of the screen in one embodiment of the present invention. As shown in FIG. 2, the MES feeds back the verification success result to the EIS (S1001), so that the EIS can download three attribute values relevant to the service life, which are respectively the current use frequency of the screen A, the extreme use frequency of the screen A and the service life alarm threshold of the screen A, to the equipment at the same time when the EIS sends the verification result to the equipment side (S1002).

And then printing is started; the frequency is cumulatively counted by taking the current use frequency as the start (S1003); when the use frequency reaches the alarm threshold, a replacement alarm is generated (S1004); and the equipment side sends the alarm information to the EIS (S1005), so as to report the alarm information to the MES through the EIS (S1006). The MES will send the alarm information to the monitor terminal (S1007), so as to display the alarm information on the monitor terminal to remind the operator that the screen A has approaches the service life and must be replaced in time (S1008).

At this point, if the screen A is removed when reaching the service life, a screen B is put in use on the machine and verified, and the step S601 as shown in FIG. 8 is executed. If the operator does not replace the expired screen A in time, the equipment side will generate a crash alarm (S1009), and the equipment stops running. And then the equipment side will send the crash alarm to the EIS (S1010); the EIS will send the crash alarm information to the MES (S1011); and the crash alarm information is sent to the monitor terminal through the MES (S1012) and finally displayed on a monitor to attract the attention of the operators (S1013).

It should be noted that the foregoing screen control method described on the server side corresponds to the screen control method described on the equipment side in the embodiment. No further description will be given here to those details not disclosed in the embodiment.

In summary, in the screen control method provided by the embodiment of the present invention, the service life of the screen is subjected to synchronous management, and replacement or crash alarm is made according to the service life frequency of the screen, which realizes the informatization management of the service life of the screen. And the operators are reminded in time to replace the screen, so as to avoid the delay of the production time and improve the equipment activation.

In order to implement the embodiment, the present invention further provides a server. The server may at least comprise a processor and a memory. The processor may process computer program instructions in the memory, so as to execute operators corresponding to the instructions. The processor may be a general purpose processor or a special purpose processor.

Figure 13:
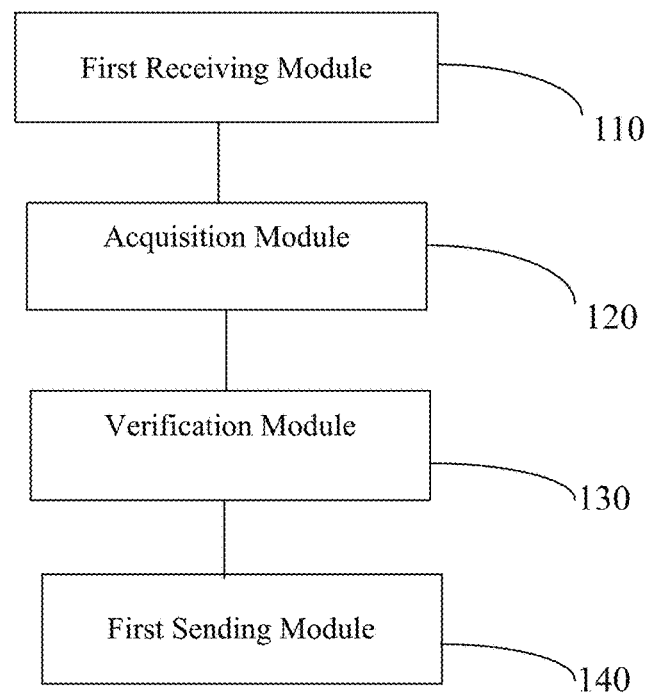
FIG. 13 is a schematic structural view of a server provided by the first embodiment of the present invention.

FIG. 13 is a schematic structural view of a server provided by the first embodiment of the present invention. As illustrated in FIG. 13, the server comprises: a first receiving module 110, an acquisition module 120, a verification module 130 and a first sending module 140.

Wherein, the first receiving module 110 is configured to receive the screen practice verification request sent by equipment before screen printing, in which the verification request includes: a first identification of a screen and a second identification of the equipment.

In one embodiment of the present invention, the first receiving module 110 receives the screen practice verification request sent by an EIS, in which the EIS receives the first identification and the second identification sent by the EIS.

The acquisition module 120 is configured to inquire a prestored database according to the first identification and the second identification and acquire a first attribute value of the screen and a second attribute value of the equipment.

The verification module 130 is configured to verify whether the screen satisfies the practice condition according to the first attribute value and the second attribute value.

The first sending module 140 is configured to send the verification result to the equipment, so that the equipment can do corresponding operation according to the verification result.

It should be noted that the foregoing screen control method described on the server side is also applicable to the server provided by the embodiment of the present invention. The implementation principle is similar, so no further description will be given here.

In summary, in the server provided by the embodiment of the present invention, the screen practice verification request sent by the equipment is received before screen printing; the prestored database is inquired according to the first identification of the screen and the second identification of the equipment in the equipment verification request; the first attribute value of the screen and the second attribute value of the equipment are acquired; whether the screen satisfies the practice condition is verified according to the first attribute value and the second attribute value; and the verification result is sent to the equipment, so that the equipment can do corresponding operation according to the verification result. Thus, the embodiment realizes the automation of the verification whether the screen satisfies the practice condition, improves the verification efficiency and accuracy, and effectively guarantees the product yield.

Figure 14:
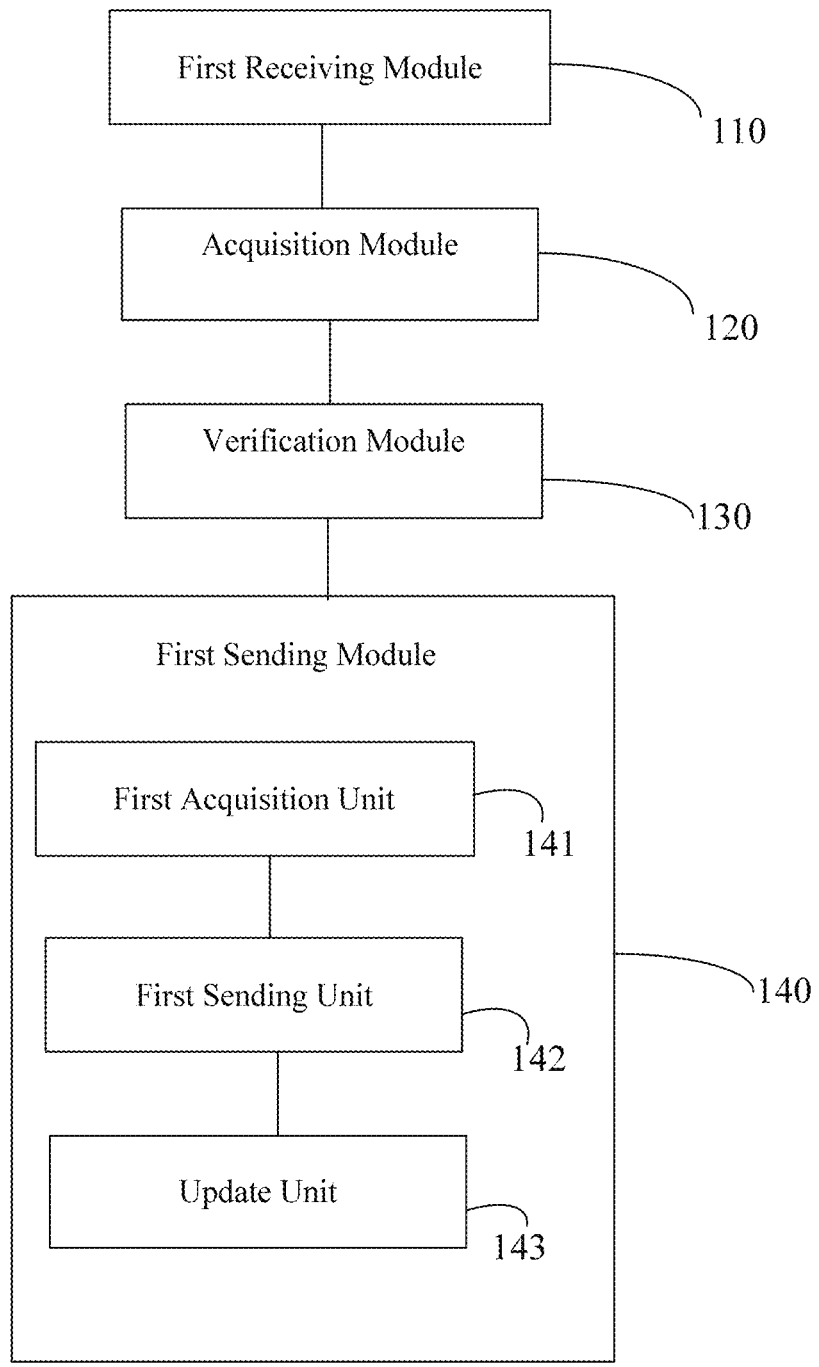
FIG. 14 is a schematic structural view of a server provided by the second embodiment of the present invention.

FIG. 14 is a schematic structural view of a server provided by the second embodiment of the present invention. As shown in FIG. 14, on the basis of FIG. 13, the first sending module 140 includes a first acquisition unit 141, a first sending unit 142 and an update unit 143.

Wherein, the first acquisition unit 141 is configured to inquire the database according to the first identification and acquire the current use frequency of the screen after verifying and knowing that the screen satisfies the practice condition.

The first sending unit 142 is configured to send the current use frequency of the screen to the equipment, so that the equipment can cumulatively count the use frequency of the screen in the equipment by taking the current use frequency as the start.

The update unit 143 is configured to receive the final use frequency uploaded by the equipment after the use of the screen, and update synchronously in the database.

Figure 15:
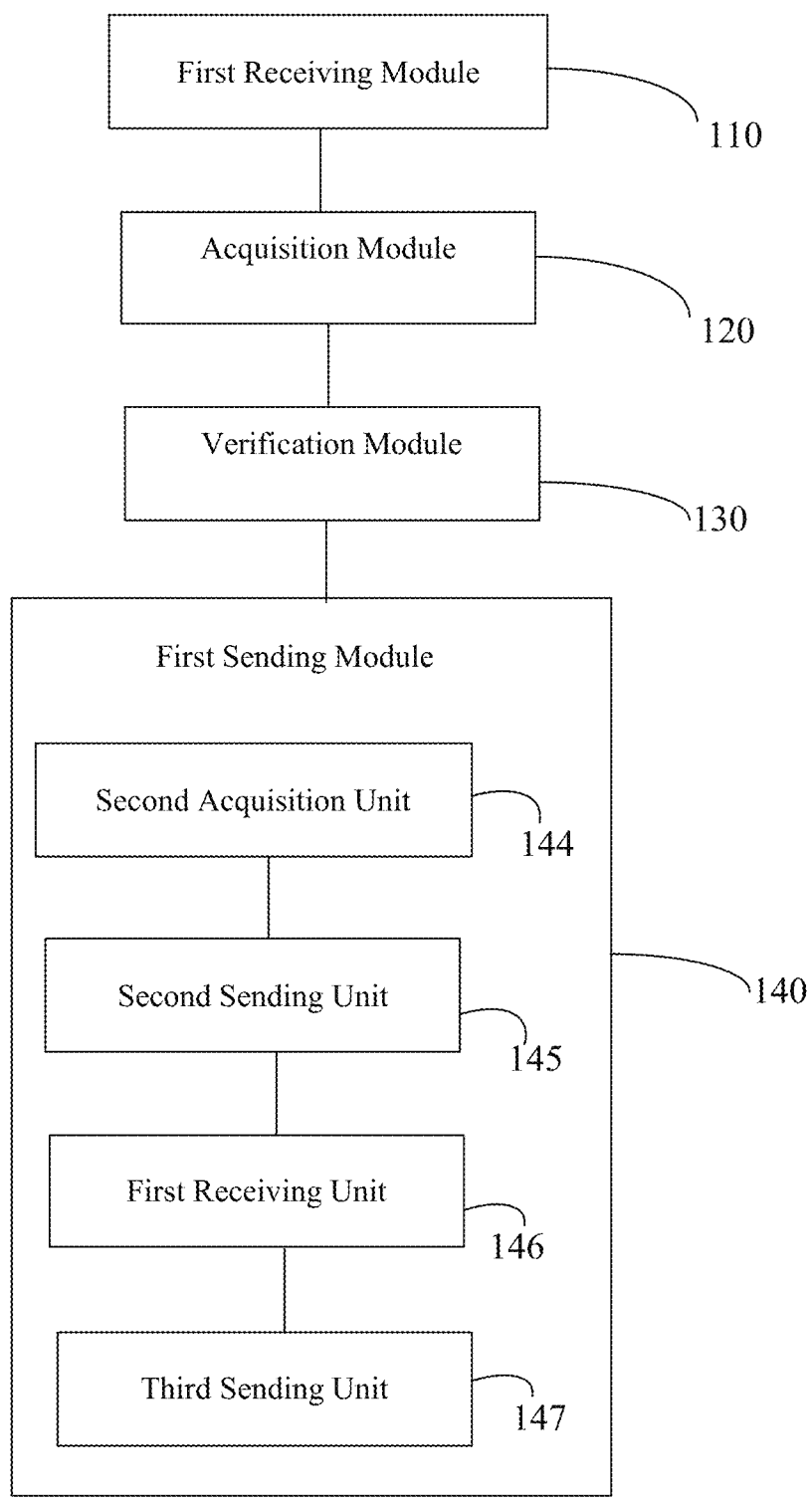
FIG. 15 is a schematic structural view of a server provided by the third embodiment of the present invention.

FIG. 15 is a schematic structural view of a server provided by the third embodiment of the present invention. As shown in FIG. 15, on the basis of FIG. 13, the first sending module 140 includes a second acquisition unit 144, a second sending unit 145, a first receiving unit 146 and a third sending unit 147.

Wherein, the second acquisition unit 144 is configured to inquire the database according to the first identification and acquire the alarm use frequency of the screen.

The second sending unit 145 is configured to send the alarm use frequency of the screen to the equipment, so that the equipment can determine whether the final current frequency reaches the alarm use frequency.

The first receiving unit 146 is configured to receive replacement alarm information sent by the equipment after the equipment determines and knows that the current use frequency reaches the alarm use frequency.

The third sending unit 147 is configured to send the replacement alarm information to a monitor terminal, so that the monitor terminal can display the replacement alarm information to the operators.

Figure 16:
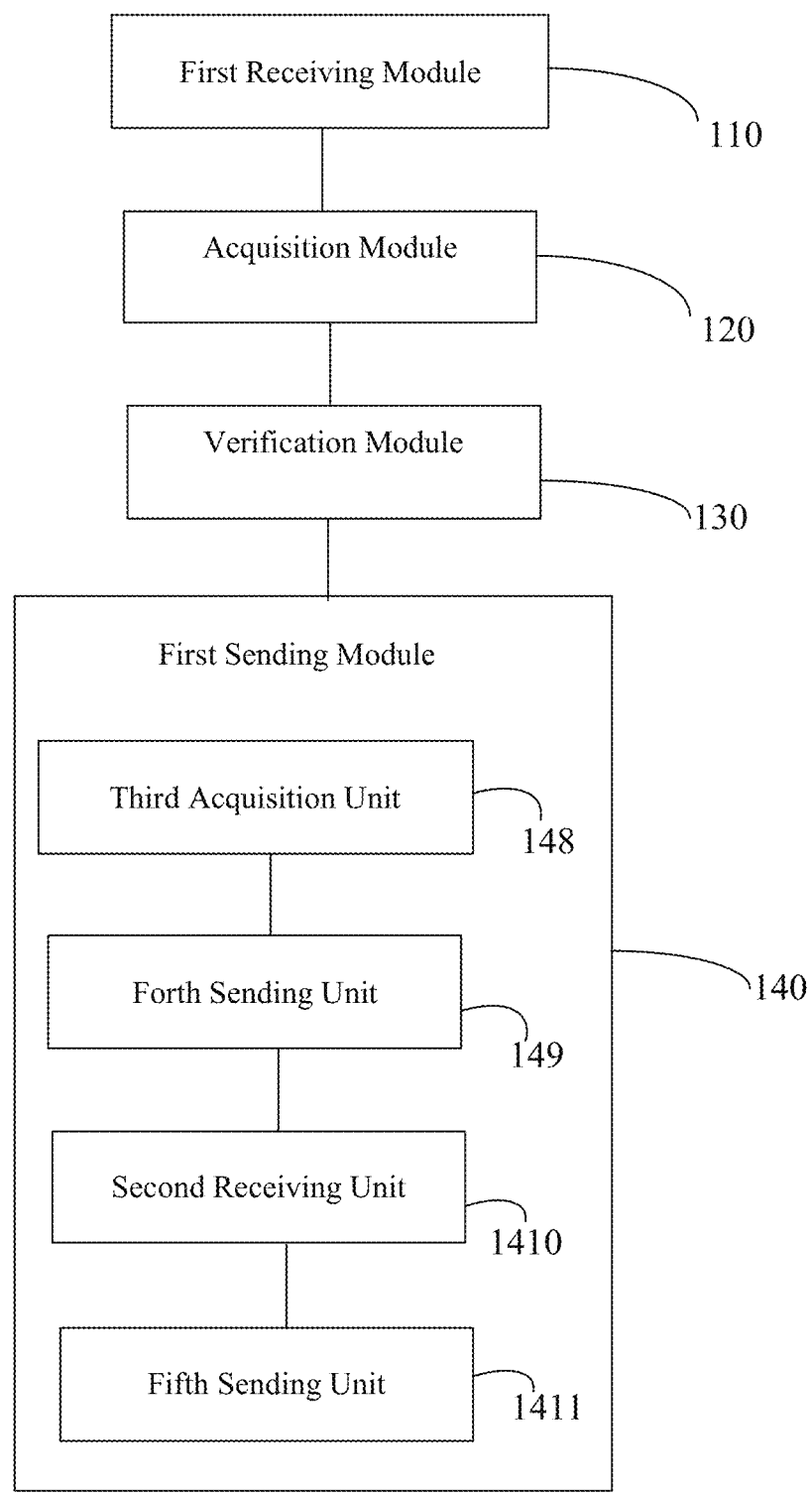
FIG. 16 is a schematic structural view of a server provided by the fourth embodiment of the present invention.

FIG. 16 is a schematic structural view of a server provided by the fourth embodiment of the present invention. As shown in FIG. 16, on the basis of FIG. 13, the first sending module 140 includes: a third acquisition unit 148, a fourth sending unit 149, a second receiving unit 1410 and a fifth sending unit 1411.

Wherein, the third acquisition unit 148 is configured to inquire the database according to the first identification and acquire the extreme use frequency of the screen.

The fourth sending unit 149 is configured to send the extreme use frequency of the screen to the equipment, so that the equipment can determine whether the current use frequency reaches the extreme use frequency.

The second receiving unit 1410 is configured to receive crash alarm information sent by the equipment when the equipment determines and knows that the current use frequency reaches the extreme use frequency.

The fifth sending unit 1411 is configured to send the crash alarm information to the monitor terminal, so that the monitor terminal can display the crash alarm information to the operators.

It should be noted that the foregoing screen control method described on the server side is also applicable to the server provided by the embodiment of the present invention. The implementation principle is similar, so no further description will be given here.

In summary, the server provided by the embodiment of the present invention performs synchronous management on the service life of the screen, performs replacement or crash alarm according to the service life frequency of the screen, realizes the informatization management of the service life of the screen, reminds the operator to replace the screen in time, and hence avoids the delay of the production time and improves the equipment activation.

In order to implement the above embodiment, the present invention further provides equipment. The equipment may at least comprise a processor and a memory. The processor may process computer program instructions in the memory, so as to execute operations corresponding to the instructions.

Figure 17:
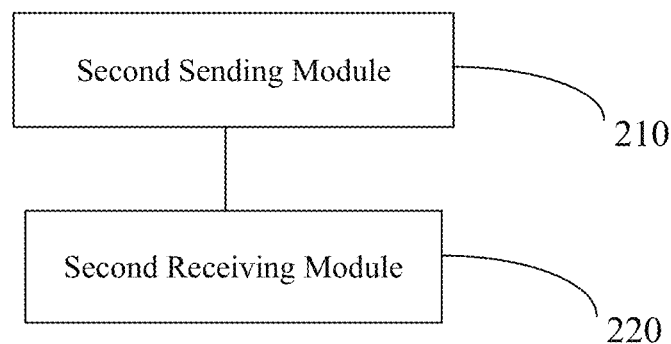
FIG. 17 is a schematic structural view of equipment provided by one embodiment of the present invention.

FIG. 17 is a schematic structural view of equipment provided by one embodiment of the present invention. As illustrated in FIG. 17, the equipment comprises a second sending module 210 and a second receiving module 220.

Wherein, the second sending module 210 is configured to send the screen practice verification request to a server before screen printing, in which the verification request includes: a first identification of a screen and a second identification of the equipment, so that the server can inquire a prestored database according to the first identification and the second identification and acquire a first attribute value of the screen and a second attribute value of the equipment.

The second receiving module 220 is configured to receive the verification result sent by the server after the server verifies whether the screen satisfies the practice condition according to the first attribute value and the second attribute value, and do corresponding operation according to the verification result.

It should be noted that the foregoing screen control method described on the equipment side is also applicable to the equipment provided by the embodiment of the present invention. The implementation principle is similar, so no further description will be given here.

In summary, the equipment provided by the embodiment of the present invention sends the screen practice verification request to the server before screen printing, and receives the verification result sent by the server when the server verifies whether the screen satisfies the practice condition according to the first attribute value and the second attribute value. Thus, the equipment realizes the automation of the verification whether the screen satisfies the practice condition, improves the verification efficiency and accuracy, and effectively guarantees the product yield.

Figure 18:
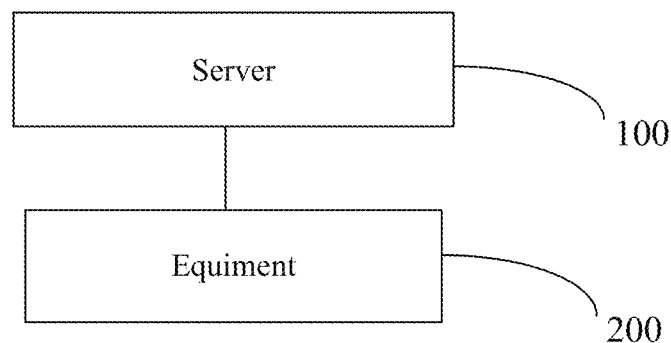
FIG. 18 is a schematic structural view of a screen control system provided by one embodiment of the present invention.

In order to implement the above embodiment, the present invention further provides a screen control system. FIG. 18 is a schematic structural view of a screen control system provided by one embodiment of the present invention. As illustrated in FIG. 18, the screen control system comprises a server 100 and equipment 200.

Wherein, the description on the server 100 refers to the description on the server with reference to FIGS. 13 to 16, and the description on the equipment 200 refers to the description on the equipment with reference to FIG. 17. The implementation principle is similar, so no further description will be given here.

Figure 19:
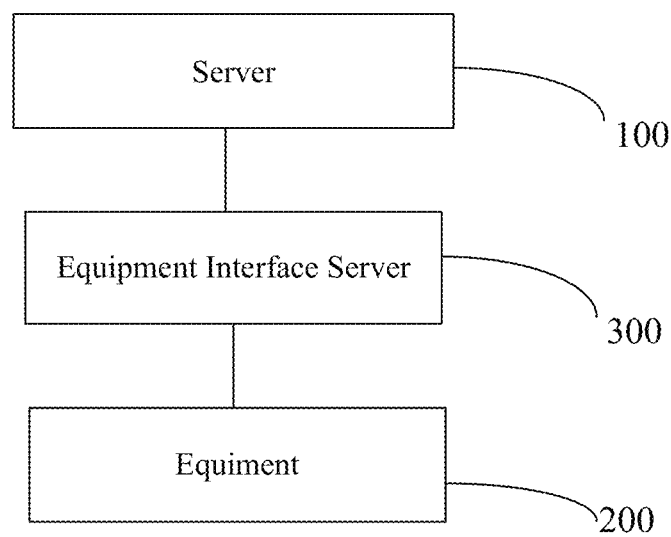
FIG. 19 is a schematic structural view of a screen control system provided by another embodiment of the present invention.

FIG. 19 is a schematic structural view of a screen control system provided by another embodiment of the present invention. As illustrated in FIG. 19, on the basis of FIG. 18, the screen control system further comprises an EIS 300, in which the EIS 300 is configured to receive the first identification and the second identification sent by the equipment, generate the screen practice verification request according to the first identification and the second identification, and send the screen practice verification request to the server.

Therefore, the screen control system provided by the embodiment of the present invention realizes the fine information management of the screen through the information integration structure manufactured on the basis of computer integration.

In order to more clearly describe the structure of the screen control system, description will be given below to the screen control system provided by the embodiment of the present invention by taking the following as an example: the server is represented by a production server; the equipment and the server are communicated with each other through the EIS; and the equipment and the EIS are communicated with each other through an equipment controller.

Figure 20:
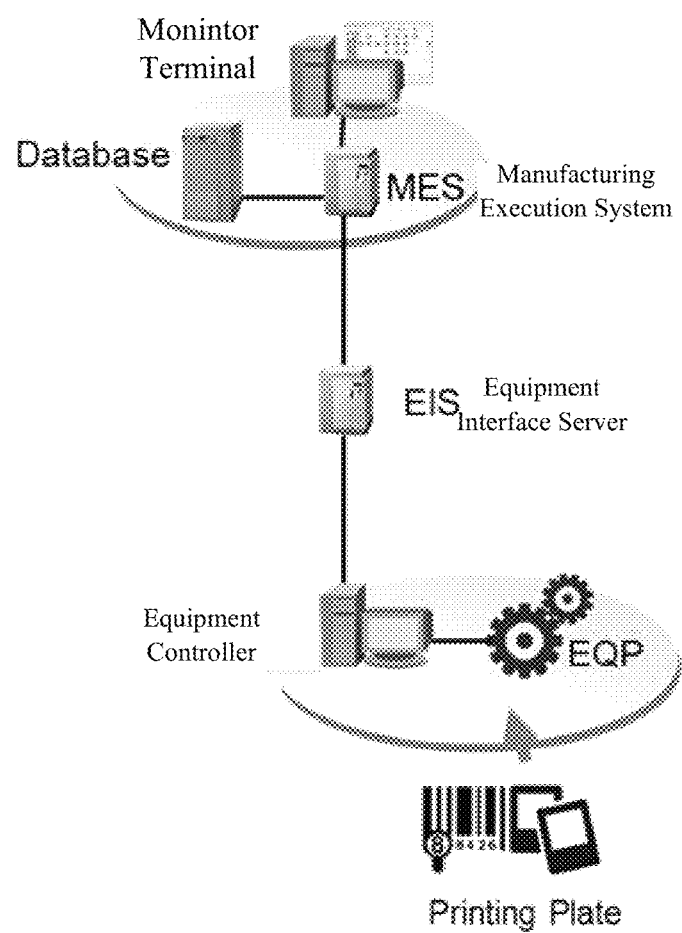
FIG. 20 is a schematic diagram illustrating the architecture of the screen control system provided by one embodiment of the present invention.

FIG. 20 is a schematic diagram illustrating the architecture of the screen control system provided by one embodiment of the present invention. As shown in FIG. 20, the equipment is communicated with the equipment controller, and the equipment controller and an MES are communicated with each other through the EIS, in which the MES performs logic processing on data through a database.

Wherein, with reference to FIG. 20, the MES may be also connected with a monitor terminal to send corresponding information relevant to the service life of the screen to the monitor terminal, so as to display the information to the operators.

In summary, the screen control system provided by the embodiment of the present invention realizes the online screen control method based on computer integration manufacturing technology, realizes the fine management of the screen, and effectively guarantees the production activation of products.

In the description of the present specification, the reference terms "one embodiment", "some embodiments", "example", "specific example", "some examples" or the like mean that specific characteristic, structure, material or feature described in conjunction with the embodiment or the example are included in at least one embodiment or example of the present invention. In the description, the schematic representation of the above terms does not need to point to the same embodiment or example. Moreover, the described specific characteristic, structure, material or feature may be combined in any suitable manner in any one or more embodiments or examples. In addition, different embodiments or examples and the characteristics of different embodiments or examples, described in the description, may be combined by those skilled in the art without conflicting with each other.

Although the embodiments of the present invention have been illustrated above, it should be understood that the embodiments are illustrative and should not be construed as the limitation of the present invention, and change, modification, replacement and deformation may be made by those skilled in the art within the scope of the present invention.

The application claims priority to the Chinese patent application No. 201710142964.3, filed Mar. 10, 2017, the disclosure of which is incorporated herein by reference as part of the application.

The invention claimed is:

1. A screen control method, applied in the server side, comprising:
   receiving a verification request of screen practice sent by equipment before screen printing by the equipment, in which the verification request includes: a first identification of a screen and a second identification of the equipment;
   inquiring a prestored database according to the first identification and the second identification, and acquiring a first attribute value of the screen and a second attribute value of the equipment; and
   verifying whether the screen satisfies a practice condition according to the first attribute value and the second attribute value to obtain a verification result, and sending the verification result to the equipment, so that the equipment can do corresponding operation according to the verification result,
   wherein the method further comprises:
   inquiring the database according to the first identification and acquiring a current use frequency of the screen in a case where it is verified and known that the screen satisfies the practice condition;

sending the current use frequency of the screen to the equipment, so that the equipment cumulatively counts a use frequency of the screen by taking the current use frequency as a starting point;

receiving a final use frequency uploaded by the equipment after end of using the screen, and updating synchronously in the database;

inquiring the database according to the first identification, and acquiring an alarm use frequency of the screen;

sending the alarm use frequency of the screen to the equipment, so that the equipment determines whether the current use frequency reaches the alarm use frequency; and receiving replacement alarm information sent by the equipment after the equipment knows that the current use frequency reaches the alarm use frequency, and sending the replacement alarm information to a monitor terminal, so that the monitor terminal displays the replacement alarm information.

2. The method according to claim 1, wherein, receiving the verification request of the screen practice sent by the equipment includes:

receiving the verification request of the screen practice sent by an equipment interface server, in which the equipment interface server receives the first identification and the second identification sent by the equipment.

3. The method according to claim 2, wherein, verifying whether the screen satisfies the practice condition according to the first attribute value and the second attribute value includes:

acquiring an initial tension value of the screen from the first attribute value, and determining whether the initial tension value falls within the preset range; and/or acquiring a product type of the screen from the first attribute value, acquiring a process type of the equipment from the second attribute value, and determining whether the product type and the process type are matched.

4. The method according to claim 1, wherein, verifying whether the screen satisfies the practice condition according to the first attribute value and the second attribute value includes:

acquiring an initial tension value of the screen from the first attribute value, and determining whether the initial tension value falls within the preset range; and/or acquiring a product type of the screen from the first attribute value, acquiring a process type of the equipment from the second attribute value, and determining whether the product type and the process type are matched.

5. The method according to claim 1, further comprising:

inquiring the database according to the first identification, and acquiring an extreme use frequency of the screen;

sending the extreme use frequency of the screen to the equipment, so that the equipment can determine whether the current use frequency reaches the extreme use frequency; and receiving crash alarm information sent by the equipment when the equipment determines and knows that the current use frequency reaches the extreme use frequency, and sending the crash alarm information to the monitor terminal, so that the monitor terminal can display the crash alarm information.

6. A screen control method, applied in the equipment side, comprising:

sending a verification request of screen practice to a server before screen printing by the equipment, in which the verification request includes: a first identification of a screen and a second identification of equipment, so that the server is capable of inquiring a prestored database according to the first identification and the second identification and acquire a first attribute value of the screen and a second attribute value of the equipment; and receiving a verification result sent by the server after the server verifies whether the screen satisfies a practice condition according to the first attribute value and the second attribute value, and doing corresponding operation according to the verification result;

wherein the method further comprises:

receiving a current use frequency of the screen, which is acquired by the server through inquiring the database according to the first identification in a case where it is verified and known that the screen satisfies the practice condition, sent by the server, and cumulatively counting a use frequency of the screen by taking the current use frequency as a starting point;

sending a final use frequency uploaded after end of using the screen to the server, so that the server updates synchronously in the database;

receiving an alarm use frequency of the screen, which is acquired by the server through inquiring the database according to the first identification, send by the server, and determining whether the current use frequency reaches the alarm use frequency; and sending replacement alarm information to the server after the equipment knows that the current use frequency reaches the alarm use frequency, so that the server sends the replacement alarm information to a monitor terminal and the monitor terminal displays the replacement alarm information.

7. A server, comprising:

a memory and a processor, wherein computer program instructions are stored in the memory; and the processor executes the following operations when processing the instructions:

receiving a verification request of screen practice sent by equipment before screen printing by the equipment, in which the verification request includes: a first identification of a screen and a second identification of equipment;

inquiring a prestored database according to the first identification and the second identification, and acquiring a first attribute value of the screen and a second attribute value of the equipment;

verifying whether the screen satisfies a practice condition according to the first attribute value and the second attribute value to obtain a verification result; and sending the verification result to the equipment, so that the equipment can do corresponding operation according to the verification result;

wherein sending the verification result to the equipment so that the equipment can do corresponding operation according to the verification result includes:

inquiring the database according to the first identification and acquiring a current use frequency of the screen after verifying and knowing that the screen satisfies the practice condition;

sending the current use frequency of the screen to the equipment, so that the equipment cumulatively counts the use frequency of the screen by taking the current use frequency as a starting point; and receiving a final use frequency uploaded by the equipment after end of using the screen, and updating synchronously in the database.

8. The server according to claim 7, wherein, receiving the verification request of the screen practice sent by the equipment includes: receiving the verification request of the screen practice sent by an Equipment Interface Server, in which the Equipment Interface Server receives the first identification and the second identification sent by the equipment.

9. The server according to claim 7 wherein, sending the verification result to the equipment so that the equipment can do corresponding operation according to the verification result further includes:

inquiring the database according to the first identification, and acquiring an alarm use frequency of the screen;

sending the alarm use frequency of the screen to the equipment, so that the equipment can determine whether the current use frequency reaches the alarm use frequency;

receiving replacement alarm information sent by the equipment after the equipment determines and knows that the current use frequency reaches the alarm use frequency; and sending the replacement alarm information to a monitor terminal, so that he monitor terminal can display the replacement alarm information to operators.

10. The server according to claim 9, wherein, sending the verification result to the equipment so that the equipment can do corresponding operation according to the verification result includes:

inquiring the database according to the first identification, and acquiring an extreme use frequency of the screen;

sending the extreme use frequency of the screen to the equipment, so that the equipment can determine whether the current use frequency reaches the extreme use frequency;

receiving crash alarm information sent by the equipment when the equipment determines and knows that the current use frequency reaches the extreme use frequency; and sending the crash alarm information to the monitor terminal, so that the monitor terminal can display the crash alarm information.

* * * * *

UNITED STATES PATENT AND TRADEMARK OFFICE
CERTIFICATE OF CORRECTION

PATENT NO. : 10,663,958 B2  
APPLICATION NO. : 15/763297  
DATED : July 7, 2020  
INVENTOR(S) : Bing Han Page 1 of 1

It is certified that error appears in the above-identified patent and that said Letters Patent is hereby corrected as shown below:

On the Title Page

Item (73) Assignee:
BOE TECHNOLOGY GROUP., LTD., Beijing (CN)
HEFEI XINSHENG OPTOELECTRONICS TECHNOLOGY CO., LTD. (Anhui, CN)

Is changed to:
BOE TECHNOLOGY GROUP CO., LTD., Beijing (CN)
HEFEI XINSHENG OPTOELECTRONICS TECHNOLOGY CO., LTD. (Anhui, CN)

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*